US006977676B1

(12) United States Patent
Sato et al.

(10) Patent No.: US 6,977,676 B1
(45) Date of Patent: Dec. 20, 2005

(54) CAMERA CONTROL SYSTEM

(75) Inventors: Mamoru Sato, Tokyo (JP); Akihiko Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/346,256

(22) Filed: Jul. 1, 1999

(30) Foreign Application Priority Data

| Jul. 8, 1998 | (JP) | ................................ 10-192682 |
| May 28, 1999 | (JP) | ................................ 11-150609 |
| May 28, 1999 | (JP) | ................................ 11-150611 |

(51) Int. Cl.$^7$ .......................................... H04N 5/232
(52) U.S. Cl. ................ 348/211.11; 348/350; 348/14.08
(58) Field of Search ........................ 348/211.99, 211.1, 348/211.2, 211.3, 211.4, 211.5, 211.6, 211.7, 348/211.8, 211.9, 36, 39, 350, 588, 211.11–211.14, 348/14.08–14.09

(56) References Cited

U.S. PATENT DOCUMENTS

| 4,566,763 A | | 1/1986 | Greguss | |
| 4,953,029 A | * | 8/1990 | Morimoto et al. | ............ 348/64 |
| 5,005,083 A | * | 4/1991 | Grage et al. | ............ 348/164 |
| 5,754,230 A | * | 5/1998 | Tsuruta | ............ 348/333.12 |
| 5,903,319 A | * | 5/1999 | Busko et al. | ............ 348/607 |
| 6,593,969 B1 | * | 7/2003 | Driscoll et al. | ............ 348/335 |
| 6,624,846 B1 | * | 9/2003 | Lassiter | ............ 348/211.4 |
| 2002/0152557 A1 | * | 10/2002 | Elberbaum | ............ 8/405 |

FOREIGN PATENT DOCUMENTS

| JP | 59-192220 | 10/1984 |
| WO | WO 95/06303 | 3/1995 |

* cited by examiner

Primary Examiner—David L. Ometz
Assistant Examiner—Gevell Selby
(74) Attorney, Agent, or Firm—Cowan, Liebowitz & Latman, P.C.

(57) ABSTRACT

In a camera control system capable of, in a video conference, remote surveillance or the like, issuing an instruction for a camera posture or the like, the user desires, on the moment in a simple way, an image with a small angle of view and a panoramic image are transmitted to a personal computer to be individually displayed. This arrangement constructs a system whereby the user can see not only a detailed image the user desires now but also an image surrounding the detailed image in substantially real time. Further, another arrangement for sensing an image reflected by a convex mirror which is constructed such that a central portion thereof is formed as a low-curvature surface and a peripheral portion thereof is formed as a high-curvature surface enables a panoramic image having a high resolution in a desired portion thereof to be obtained by using only one image sensor.

23 Claims, 19 Drawing Sheets

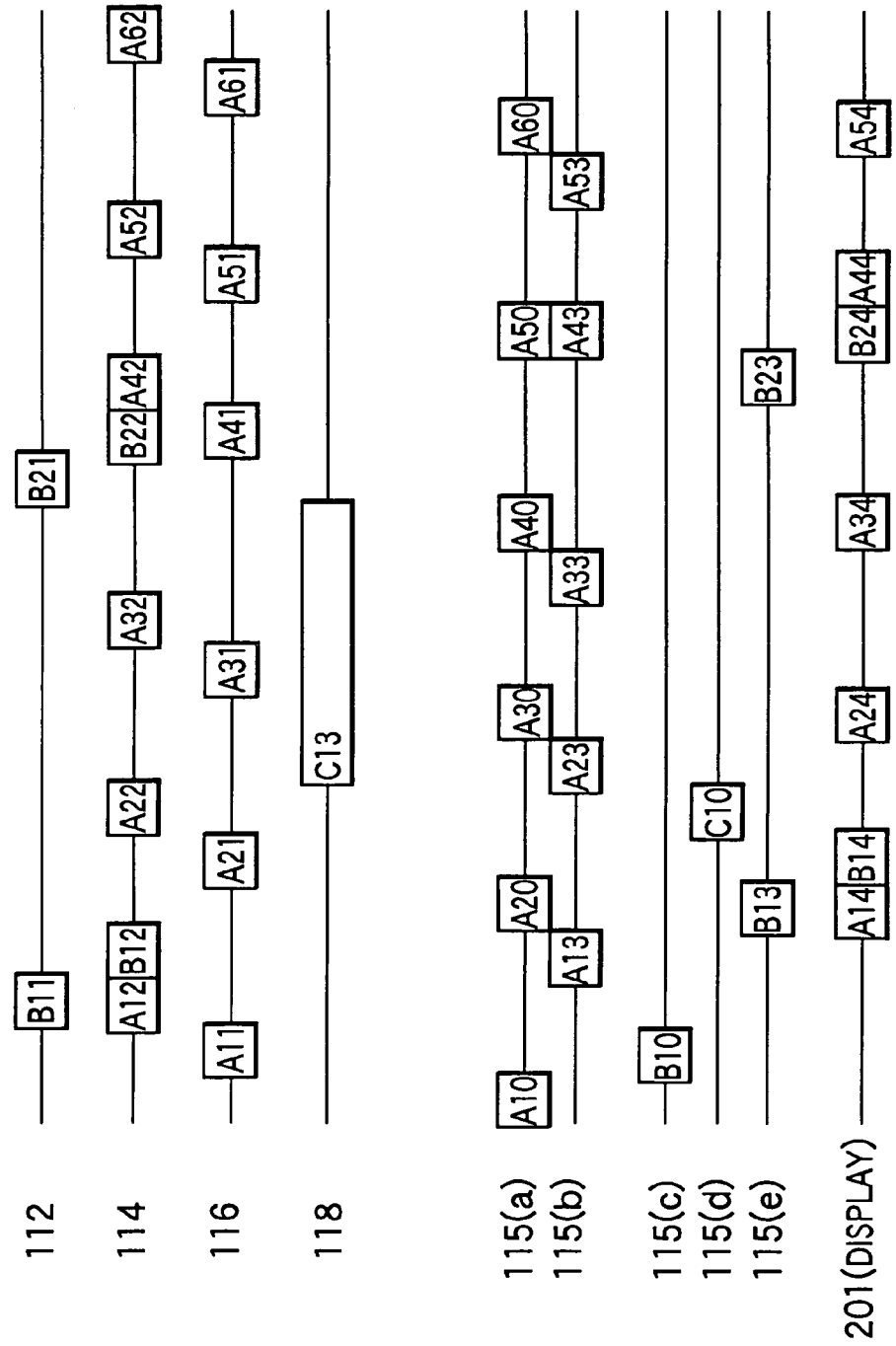

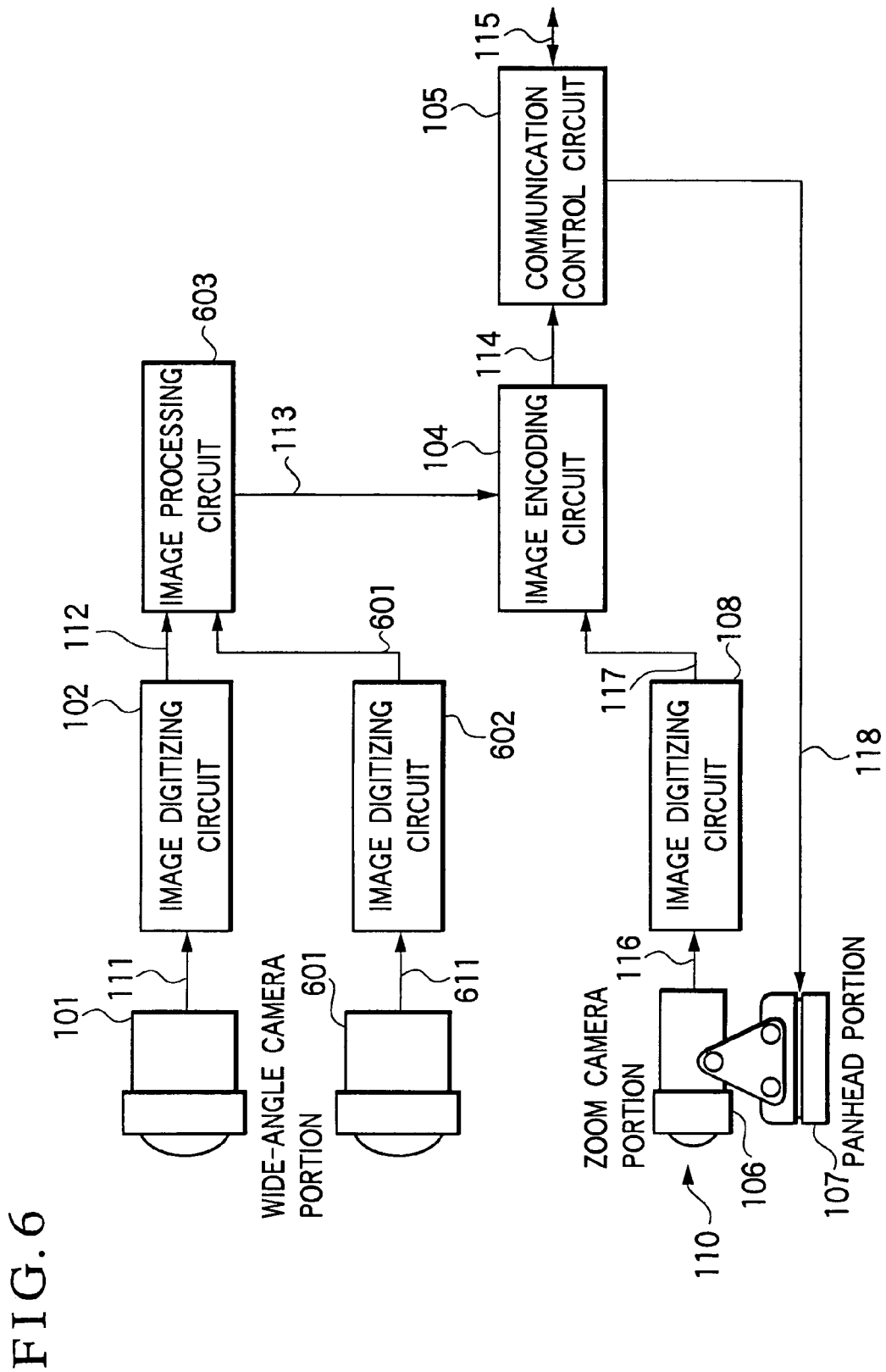

CAMERA CONTROL SYSTEM

BACKGROUND OF THE INVENTION

1. Field of the Invention

The present invention relates to a camera control system, and more particularly to a system suitably applicable to video data communication processing systems, such as video conference systems and video surveillance systems, which remotely use moving image data inputted from a camera and processed in a digital processing unit.

2. Description of Related Art

So far, in the fields including video conference systems and surveillance camera systems, their systems are made up of a camera and a user terminal in which parameters or the like of the camera are controllable through a network from a distance, and are composed such that the user remotely controls the camera for receiving and displaying images picked up thereby. Further, as the camera, there has been employed a camera with a panhead which allows variation of the image pickup direction.

This panhead-mounted camera has employed a method of using a dedicated controller and of controlling the horizontal (rightward and leftward) panning and the vertical (upward and downward) tilting of the camera with a button or a joy stick of the controller. Further, in recent years, a dedicated controller has been displayed on a displaying unit of a computer in a pseudo manner through the use of a GUI or the like and controlled through a mouse or the like.

In addition, many surveillance cameras, being equipped with a panhead, are composed such that the panhead is controlled to take predetermined movements to monitor images of some places predetermined.

However, in the case of these conventional systems, video images transmitted are only video images of a subject actually picked up by a panhead-mounted camera at some points of time, with the result that it is impossible to view the situations around the subject and further to beforehand know, by intuition, video images to be picked up after movements of the panhead. For this reason, in order to pick up an image at a desired position, there is a need to correct frequently the position of the panhead while viewing the video images transmitted.

Meanwhile, when a cameraman takes a photograph with a camera in a photographing site, the cameraman looks through a viewfinder of the camera with his one eye, while observing the periphery with the other eye, so that the camera can be set at an angle for the next photographing on the moment. This is due to the fact that the cameraman sees some periphery to be further photographed concurrently with seeing an image within the viewfinder for the actual photographing.

Thus, in the video conference systems or the remote surveillance systems, in the case of interactively implementing the posture control for a remote camera with a panhead while viewing a video image, if the panhead is controlled while the images of all the areas to be sensed by movements of the camera are seen, the user feels as if the cameraman controls the image-pickup range with a camera in that site, which facilitates its manipulations.

In a method taken so far therefor, first of all, a camera is moved to pick up all the image-pickup areas, and, further, all the obtained images are processed into one image. Then, the user controls the image pickup direction and the zoom of the camera while seeing a still image which is the thus-obtained one image.

However, the image of the entire area produced by such image processing is a still image but not a video image to be obtained in real time. Therefore, a problem arises in that difficulty is encountered to deal sufficiently with the cases that there is an extreme need to set the camera at a desired angle momentarily, such as the case that a camera is to be pointed at a participant asking to speak in a video conference and the case that the camera is to be pointed at a trespasser appearing suddenly in remote surveillance.

BRIEF SUMMARY OF THE INVENTION

Accordingly, the present invention has been developed with a view to eliminating such a problem, and it is an object of the invention to provide an arrangement capable of easily and momentarily giving an instruction on a camera posture or the like the user desires.

Another object of the invention is to provide an arrangement capable of obtaining an extra-wide-angle moving image showing a high resolution at a central portion of the image.

A further object of the invention is to eliminate distortion occurring at a peripheral portion of the moving image and to process the moving image into a panoramic image.

To attain the above objects, in accordance with an aspect of the invention, there is provided a camera control system, which comprises first image pickup means for picking up an image of an object through a wide-angle lens having distortion, to output a moving image, image processing means for performing projective transformation processing to correct distortion of the moving image outputted from the first image pickup means, second image pickup means having no distortion, for outputting a moving image, display means for displaying the moving image processed by the image processing means, and for superimposing and displaying, on the displayed moving image, a rectangular frame indicative of an image-pickup area of the second image pickup means, designating means for designating a desired rectangular area within the moving image displayed by the display means, and control means for controlling at least one of panning, tilting and zooming of the second image pickup means in such a way as to pick up an image corresponding to the rectangular area designated by the designating means.

In accordance with another aspect of the invention, there is provided a camera control system, which comprises a convex mirror for reflecting object light incident thereon, and image pickup means for picking up the object light reflected from the convex mirror, to output a moving image, wherein the convex mirror is constructed such that a surface thereof has a fovea-centralis-like configuration in which a central portion of the surface is formed as a low-curvature surface and a peripheral portion of the surface is formed as a high-curvature surface.

In accordance with a further aspect of the invention, there is provided a camera control method, which comprises the steps of picking up an image of an object by using first image pickup means through a wide-angle lens having distortion, to output a moving image, performing projective transformation processing to correct distortion of the moving image outputted from the first image pickup means, outputting a moving image by using second image pickup means having no distortion, displaying the processed moving image, and superimposing and displaying, on the displayed moving image, a rectangular frame indicative of an image-pickup area of the second image pickup means, designating a desired rectangular area within the displayed moving image, and controlling at least one of panning, tilting and zooming of the second image pickup means in such a way as to pick up an image corresponding to the designated rectangular area.

In accordance with a still further aspect of the invention, there is provided a storage medium which stores therein a program for executing a process of controlling a camera control system, the process comprising picking up an image of an object by using first image pickup means through a wide-angle lens having distortion, to output a moving image, performing projective transformation processing to correct distortion of the moving image outputted from the first image pickup means, outputting a moving image by using second image pickup means having no distortion, displaying the processed moving image, and superimposing and displaying, on the displayed moving image, a rectangular frame indicative of an image-pickup area of the second image pickup means, designating a desired rectangular area within the displayed moving image, and controlling at least one of panning, tilting and zooming of the second image pickup means in such a way as to pick up an image corresponding to the designated rectangular area.

The above and further objects and features of the invention will become more readily apparent from the following detailed description of preferred embodiments taken in conjunction with the accompanying drawings.

BRIEF DESCRIPTION OF THE SEVERAL VIEWS OF THE DRAWING

FIG. 3 is a data flow chart useful for describing an operation of the camera control system according to the first embodiment of the invention.

FIG. 6 is a block diagram showing the arrangement of a camera control system according to a second embodiment of the invention.

DETAILED DESCRIPTION OF THE INVENTION

Hereinafter, preferred embodiments of the invention will be described in detail with reference to the drawings.

Figure 1:
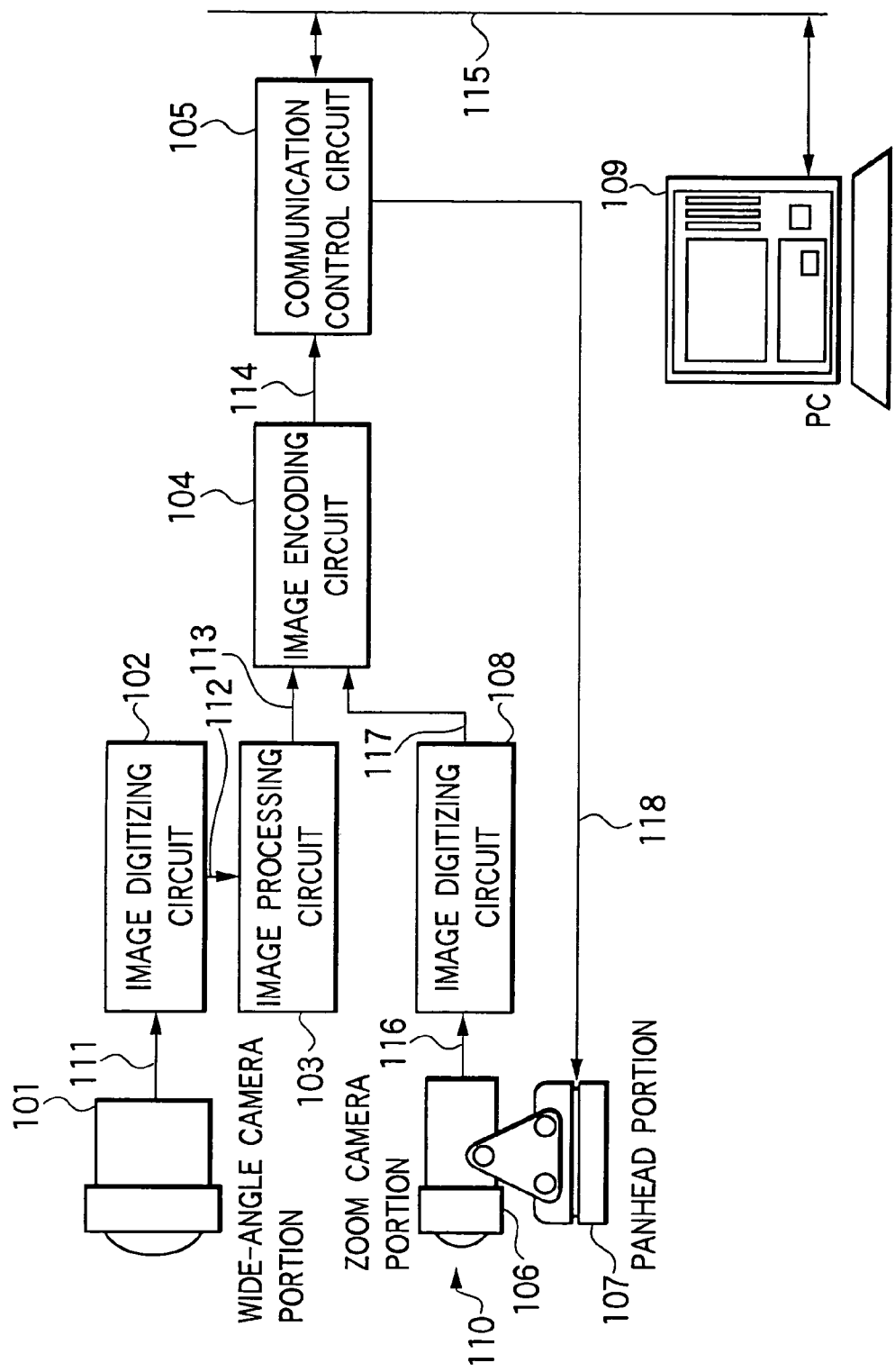
FIG. 1 is a block diagram showing the arrangement of a camera control system according to a first embodiment of the invention.

FIG. 1 is a block diagram showing a camera control system according to a first embodiment. In FIG. 1, reference numeral 101 represents a wide-angle camera portion which can pick up an image at a wide angle of view (field), reference numeral 102 designates an image digitizing circuit for digitizing a video image taken by the wide-angle camera portion 101, reference numeral 103 depicts an image processing circuit for processing the video image digitized, and reference numeral 104 denotes an image encoding circuit for encoding a video image.

Further, reference numeral 105 signifies a communication control circuit composed a CPU, a memory, a network adapter and others, reference numeral 106 means a zoom camera portion of a camera 110 equipped with a panhead, reference numeral 107 indicates a panhead portion of the panhead-mounted camera 110, reference numeral 108 shows an image digitizing circuit for digitizing a video image taken by the panhead-mounted camera 110, and reference numeral 109 represents a second apparatus located at a remote place through a network. Besides, in conjunction with the second apparatus 109, a first apparatus is provided which is made up of the above elements 101 to 108.

Although not described in detail, the second apparatus 109 is constructed with the existing personal computer (PC), network PC, workstation or the like having, for example, a function of displaying hypertext data, and connected to a network. In the first embodiment, a description will be given in the case that used as the second apparatus 109 is a PC which is capable of displaying digital images through the use of a display software for JPEG images or the like.

Figure 2:
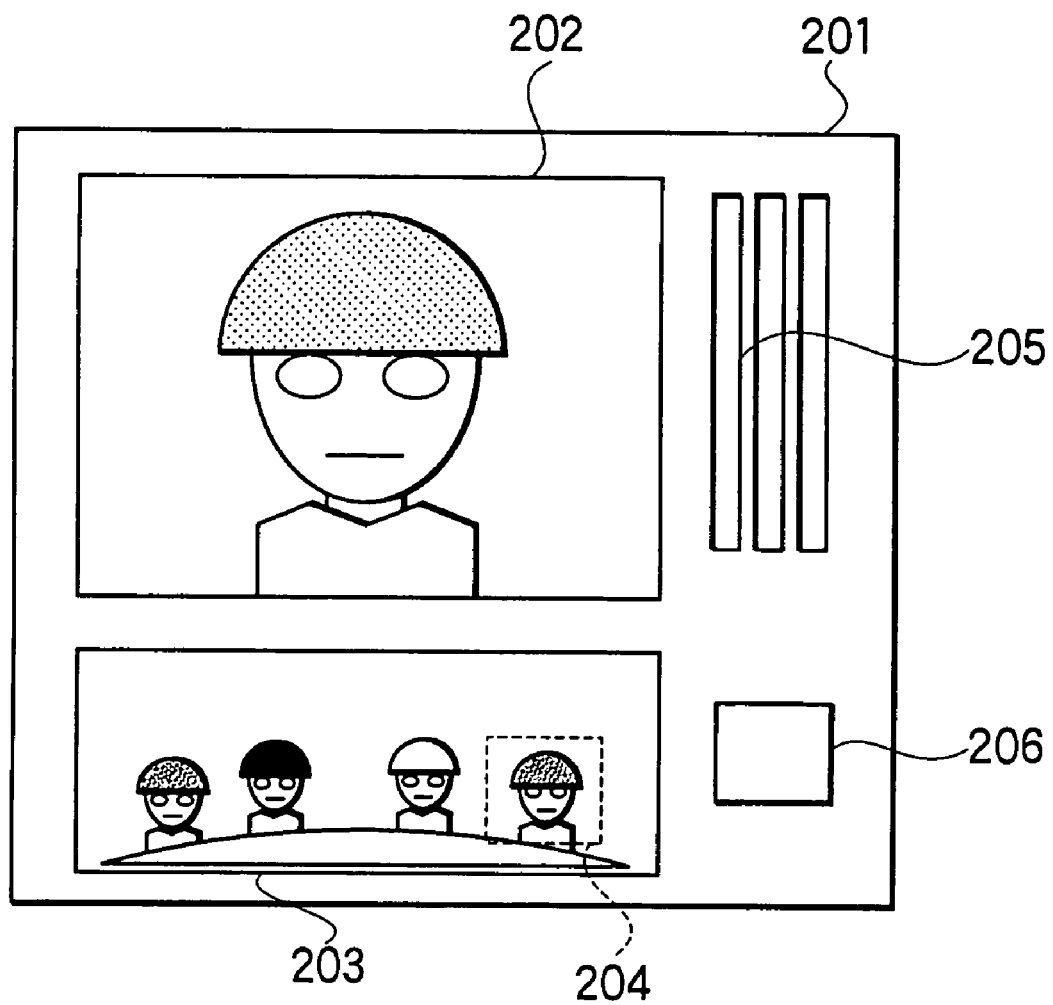
FIG. 2 is an illustration of an example of image display in the first embodiment of the invention.

FIG. 2 is an illustration of an example of display of a video image on the PC 109 in the first embodiment. As illustrated, the video image is displayed on a multiwindow system. In FIG. 2, reference numeral 201 designates a display, reference numeral 202 depicts a detailed image display window for displaying a video image taken by the panhead-mounted camera 110, and reference numeral 203 denotes a panoramic image display window for displaying a video image taken by the wide-angle camera portion 101.

Further, reference numeral 204 signifies an indication frame for indicating a portion of the entire image (panoramic image) corresponding to the detailed image. The indication frame 204 is displayed in a state of being superimposed on the panoramic image display window 203. Reference numeral 205 represents a slider bar by the GUI for carrying out the zoom control of the zoom camera portion 106, and reference numeral 206 designates a GUI button for acquiring the right to control the panhead-mounted camera 110.

FIG. 3 is an illustrative time chart showing data flow in the first embodiment. In FIG. 3 (also in FIG. 1), reference numeral 112 denotes a video signal obtained by the wide-angle camera portion 101, reference numeral 114 depicts a video signal compressed and encoded in the image encoding circuit 104, reference numeral 116 designates a video signal obtained by the panhead-mounted camera 110, and reference numeral 118 signifies a control signal for controlling the zoom camera portion 106 and the panhead portion 107.

In addition, reference numeral 115 signifies network signals flowing on the network, including five signals, i.e., a panhead camera image request signal 115(*a*), a panhead camera encoded video signal 115(*b*), a wide-angle camera image request signal 115(*c*), a panhead and zoom control signal 115(*d*) and a wide-angle camera encoded video signal 115(*e*). Incidentally, in FIG. 3, the horizontal axis represents time.

FIGS. 4(*a*) to 4(*c*) schematically show a video image taken by the wide-angle camera portion 101. In the description of the first embodiment, a camera with an orthogonal projection type fisheye lens having a distortion aberration is used as the wide-angle camera portion 101.

FIG. 4(*a*) schematically shows light incident on the fisheye lens in a three-dimensional manner. In FIG. 4(*a*), reference marks A to F designate columns standing perpendicularly on a plane passing through the optical axis. The column A stands at an angle of 0° with respect to the optical axis, and the column B stands at an angle of 10° with respect to the optical axis. Further, the columns C, D, E and F stand at angles of 30°, 45°, 60° and 90°, respectively. The distances of the columns A to F to the fisheye lens are all the same.

FIG. 4(*b*) shows images obtained by sensing the columns A to F using the fisheye lens. In FIG. 4(*b*), reference marks A' to F' represent the images of the columns A to F in FIG. 4(*a*), respectively.

FIG. 4(*c*) shows a panoramic image in which the columns A to F are expressed such that the angles of the images thereof with respect to the optical axis become constant. In FIG. 4(*c*), reference marks A" to F" denote the images of the columns A to F in FIG. 4(*a*), respectively.

FIGS. 5(*a*) and 5(*b*) are illustrations of panoramic images corresponding to images taken by the wide-angle camera portion 101. In FIGS. 5(*a*) and 5(*b*), reference numeral 51 represents a video image of a half of the sky taken by the fisheye lens, and reference numeral 52 signifies, in the real world, a portion of the half-of-the-sky image in a range of ±90° in horizontal directions and ±30° in vertical directions. Further, reference numeral 54 denotes a panoramic image to be displayed actually, and arrows 53 and 55 depict the directions of the image processing. Besides, the values put in parentheses signify coordinate positions on the video images.

An operation in the first embodiment will be described hereinbelow with reference to FIG. 1 to FIGS. 5(*a*) and 5(*b*). First of all, a description will be made of the flows of video data with reference to FIG. 1.

A video signal 111, which is obtained in such a manner that the wide-angle camera portion 101 having a fisheye lens senses an image, is converted into a digital video signal 112 by the image digitizing circuit 102 and further subjected to image processing, which will be described herein later, by the image processing circuit 103, thereby providing a panoramic video signal 113. The panoramic video signal 113 is compressed and encoded by the image encoding circuit 104 according to a coding method such as JPEG.

On the other hand, a video signal 116, which is obtained in such a manner that the zoom camera portion 106 of the panhead-mounted camera 110 senses an image, is converted into a digital video signal 117 by the image digitizing circuit 108 and further compressed and encoded by the image encoding circuit 104. The image encoding circuit 104 chooses one of the panoramic video signal 113 outputted from the image processing circuit 103 and the digital video signal 117 outputted from the image digitizing circuit 108 to encode the selected video signal.

A video signal 114 encoded by the image encoding circuit 104 is forwarded to the communication control circuit 105 and then sent to the network to be put in the PC 109. Further, the video signal 114, after undergoing decoding processing and others in the PC 109, appears on the display. In this case, the network signifies a computer network conforming to the Internet using, for example, TCP/IP.

Secondly, referring to FIG. 3, a description will be given hereinbelow of the flow of video images and camera control.

A control program loaded on the PC 109 first sends the panhead camera image request signal 115(*a*) (panhead camera image request A10). The panhead camera image request A10 from the PC 109 is received by the communication control circuit 105. The communication control circuit 105 issues an instruction to the image encoding circuit 104 for the selection of the digital video signal 117 from the image digitizing circuit 108.

In this instance, one frame of the video image put in the image digitizing circuit 108 corresponds to a frame A11 of the panhead camera video signal 116, and the frame A11 is encoded by the image encoding circuit 104 to become a frame A12 of the encoded video signal 114. Further, the frame A12 is converted by the communication control circuit 105 into a frame A13 of the panhead camera encoded video signal 115(*b*), which, in turn, is sent to the network to be displayed as a frame A14 in the detailed image display window 202 in FIG. 2 by the PC 109. Such a series of operations is repeated until the user issues an instruction on completion (the panhead camera image request signal 115(*a*) is outputted as A20, A30, ... subsequent to A10 at a constant interval).

On the other hand, the control program loaded on the PC 109 sends the wide-angle camera image request signal 115(*c*) (panoramic image request B10). The panoramic image request B10 from the PC 109 is received by the communication control circuit 105. The communication control circuit 105 issues an instruction to the image encoding circuit 104 for the selection of the panoramic video signal 113 from the image processing circuit 103.

In this instance, one frame of the video image put in the image processing unit 103 corresponds to a frame B11 of the wide-angle camera video signal 112, and the frame B11 is converted into a panoramic video signal in the image processing circuit 103 and encoded by the image encoding circuit 104 into a frame B12 of the encoded video signal 114. Further, at this time, the communication control circuit 105 superimposes the parameters for the panhead portion 107 and the zoom camera portion 106 on the frame B12, thus producing a frame B13 of the wide-angle camera encoded video signal 115(e), which, in turn, is transmitted to the network.

Further, by the PC 109, the frame B13 is displayed as a frame B14 in the panoramic image display window 203 in FIG. 2. At this time, the control program of the PC 109 causes a rectangular indication frame 204 to be displayed on the panoramic video image of the frame B14 appearing in the panoramic image display window 203 in a superimposed manner on the basis of the parameters for the panhead portion 107 and the zoom camera portion 106 superimposed in the frame B13.

When observing the display 201 in this point of time, the user easily can check the pointed direction of the panhead-mounted camera 110 or determine the direction in which the panhead-mounted camera 110 is turned next. Accordingly, the user can issue a control instruction for the position of the panhead portion 107 and the zooming of the zoom camera portion 106 through the use of the control program loaded on the PC 109.

The position of the panhead portion 107 is specified, for example, by moving the indication frame 204 on the panoramic image display window 203 to a desired position or area with a mouse. Further, an instruction for the zooming control for the zoom camera portion 106 is made using the slider bar 205 in FIG. 2. A control command according to this instruction is transmitted as a control command C10 of the panhead and zoom control signal 115(d) from the PC 109 to the network. Still further, the control command 10 is received by the communication control circuit 105 and sent as a zoom and panhead operation instruction C13 of the zoom and panhead control signal 118 to the panhead-mounted camera 110.

The communication control circuit 105 monitors and controls the panhead portion 107 and the zoom camera portion 106, and when the operation is completed according to the control command C10, issues an instruction to the image encoding circuit 104 for the selection of the panoramic video signal 113 from the image processing circuit 103. Accordingly, the image encoding circuit 104 encodes a panoramic image B21 produced from the wide-angle camera video signal 112 to produce a frame B22 of the encoded video signal 114.

Moreover, at this time, with the superimposition of the parameters for the panhead portion 107 and the zoom camera portion 106 by the communication control circuit 105, the above frame B22 turns to a frame B23 of the wide-angle camera encoded video signal 115(e), which, in turn, is forwarded to the PC 109. This video image is displayed as a frame B24 on the panoramic image display window 203 of the PC 109. Also in this instance, the control program of the PC 109 causes the rectangular indication frame 204 to be displayed on the video image of the frame B24 in the panoramic image display window 203 in a superimposed manner on the basis of the parameters for the panhead portion 107 and the zoom camera portion 106 superimposed in the frame B23.

Among display frames of the display 201 shown in FIG. 3, the frames marked with character A are detailed images picked up by the panhead-mounted camera 110, while the frames marked with character B are panoramic images sensed by the wide-angle camera portion 101. As seen therefrom, the detailed images and the panoramic images are opportunely transmitted to the PC 109 to be put on the display 201, and in addition to the detailed image, the entire range sensible by the panhead-mounted camera 110 is simultaneously presented as the panoramic image.

Accordingly, the wide-angle camera image request signal 115(c) is also outputted at an appropriate interval, so that, in addition to the detailed image, a video image surrounding the detailed image can be seen in substantially real time. Accordingly, the variation of the peripheral situation is understandable properly. Therefore, by remotely controlling the parameters of the panhead-mounted camera 110 while observing the display 201, it is possible to set the camera at a desired angle on the moment, such as pointing the camera at a participant asking to speak in a video conference and pointing the camera at a trespasser appearing suddenly in remote surveillance.

Besides, since, to the user of the PC 109, the detailed image is higher in importance than the panoramic image, in the first embodiment the rate of the transmission of frames of the detailed image is set to be higher than the rate of transmission of frames of the panoramic image, thereby accomplishing smoother variation of video images.

Next, referring to FIGS. 4(a) to 4(c) and FIGS. 5(a) and 5(b), a detailed description will be made of a method of producing a panoramic image in the first embodiment.

The panoramic image for use in the first embodiment is one video image covering the maximum range sensible by changing the panning value, the tilting value and the zoom value in the panhead-mounted camera 110 to be used for obtaining detailed images.

In the first embodiment, it is assumed that, in the panhead-mounted camera 110, for example, the panning value is in the range of ±50°, the tilting value is in the range of ±20°, the zoom magnification is 8×, and the angle of view is 6.14° on the most telephoto side and 45.84° on the most widest-angle side. The above-mentioned panning and tilting values are set with respect to the optical axis, and the sensible range is such that the panning value is in the range of ±80.5° and the tilting value is in the range of ±42.9°.

In the first embodiment, used as the panoramic image is an image whose angle of view is fixed. For instance, if an angle of view of 1° is set to correspond to one pixel, in the case of the above-described camera, the panoramic image results in a picture of 161×86 pixels.

For the sake of simplification only, the following description will be made on the assumption that a camera is constructed such that the field of view for the panning is in the range of ±90° and the field of view for the tilting is in the range of ±30°.

The digital video signal 112 picked up by the wide-angle camera portion 101 and digitized covers a wide-range image due to the fisheye lens. However, in the case of the orthogonal projection type fisheye lens in the first embodiment or the like, unlike the above-mentioned panoramic image, the projection is made such that the angle in the normal direction at the peripheral portion is small while the angle in the normal direction at the central portion is large. This is shown in FIG. 4(b). That is, while each of the angle between the columns A' and C' and the angle between the columns E' and F' is originally 30°, the interval (separation) between the columns E' and F' at the peripheral portion is shorter than the interval between the columns A' and C' at the central portion.

A description will be given hereinbelow of the relationship among the real world, a video image by a fisheye lens and a panoramic image.

Figure 4C:
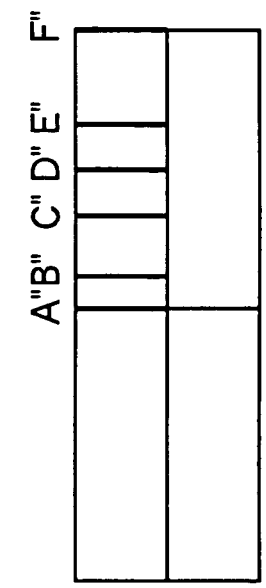
FIGS. 4(a), 4(b) and 4(c) are illustrations of the relationship between a video image sensed through a fisheye camera to be used in the first embodiment and a panoramic video image.
Figure 4B:
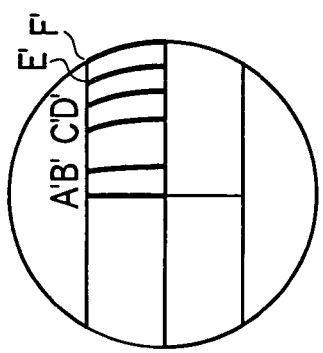
Figure 4A:
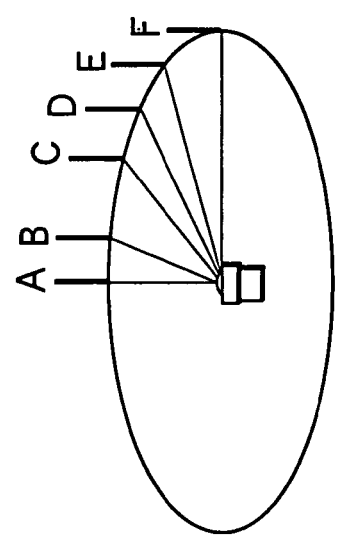

The images of the columns A to F shown in FIG. 4(a) are projected through the fisheye lens onto an image pickup element. FIG. 4(b) illustratively shows how to project the images of the columns A to F onto the image pickup element.

That is, in the case of the orthogonal projection type fisheye lens, there is the following relationship among the displacement y of an image from the center of the optical axis, the focal length ξ and the angle of incidence φ:

$$y = \xi \cdot \sin(\phi).$$

Accordingly, the images of the six columns A to F shown in FIG. 4(a) are formed on the image pickup element as indicated by A' to F' in FIG. 4(b).

The angle (=30°) between the column A and the column C and the angle (=30°) between the column E and the column F are made different as follows on the image pickup element:

$$\{\sin(30°) - \sin(0°)\} : \{\sin(90°) - \sin(60°)\} = 1 : 0.27.$$

A panoramic image obtained by the correction through the image processing is as shown in FIG. 4(c). That is, the image processing is made so that the angle of 30° between the column A and the column C and the angle of 30° between the column E and the column F assume 1: 1 on the corrected image (so that the distance between A" and C" becomes equal to the distance between E" and F").

In the first embodiment, the wide-angle camera portion 101 presents a panoramic image to be displayed by simultaneously sensing an image of the entire range the panhead-mounted camera 110 can pick up, and as the displaying way, there is used a projecting method in which the angle of field to the lens is projected and displayed linearly on the image plane. Therefore, the X coordinate represents an panning angle while the Y coordinate represents a tilting angle.

Figure 5A:
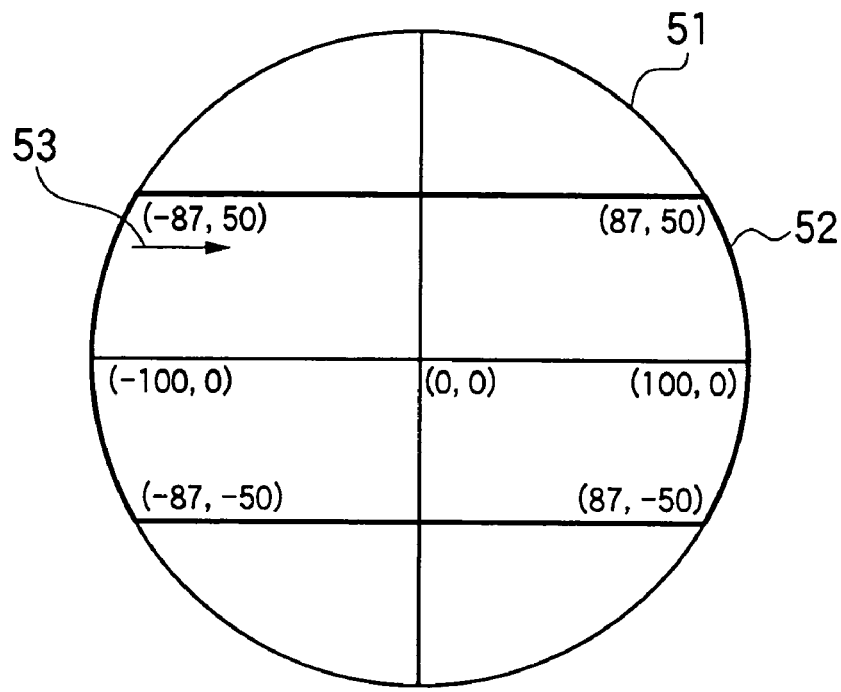
FIGS. 5(a) and 5(b) are illustrations useful for explaining image processing in the first embodiment of the invention.

For converting an image taken through the fisheye lens into a panoramic image, when a position on the panoramic image is taken as (θ, φ) and a position on the image taken through the fisheye lens, corresponding thereto, is taken as (η, ζ), the correction is made on the basis of the following relationship:

$$\eta = \xi \cdot \cos(\phi) \sin(\theta) \quad (1)$$

$$\zeta = a \cdot \xi \cdot \phi / \pi \quad (2)$$

where "a" represents a constant, and ξ depicts a radius of a circle of an image portion on the image picked up through the fisheye lens, and in FIG. 5(a), ξ=100.

The position to be picked up for a panoramic image in the first embodiment is within the following range:

$$-90 \leq \theta \leq +90, \; -30 \leq \phi \leq +30.$$

Figure 5B:
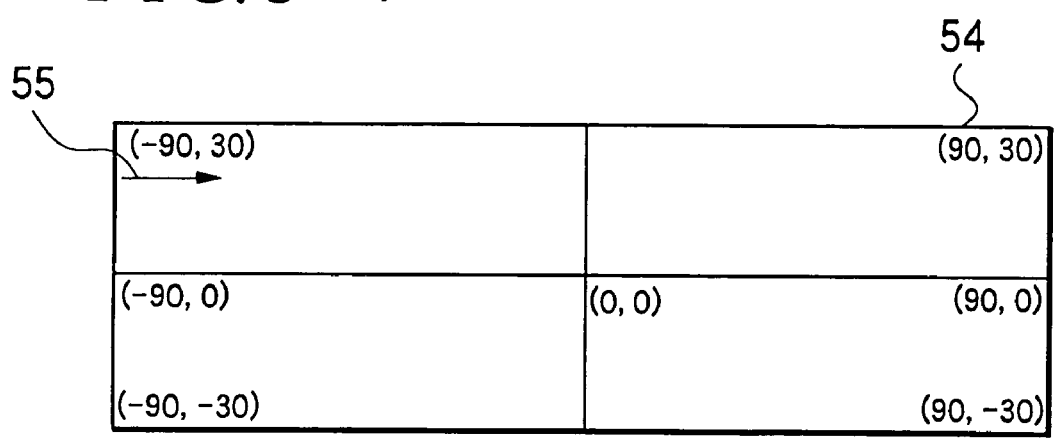

The image processing circuit 103 obtains the corresponding pixels of the image picked up through the fisheye lens in relation to all the pixels of the panoramic image within the above range. In FIG. 5(b), the rectangle designated at reference numeral 54 represents the range of the panoramic image, and the pixel values are obtained successively in a raster-scanning way in the direction indicated by the arrow 55. The image 51 in FIG. 5(a) is a half-of-the-sky image produced by the orthogonal projection type fisheye lens whose angle of view is 180°, and, of the image 51, an image covering the range 52 corresponds to the panoramic image 54 in FIG. 5(b).

The image processing circuit 103 is equipped with an image storage means (not shown), and the pixel position of the image by the fisheye lens is calculated using the above-mentioned equations (1) and (2) for each of all the 181×61 pixels of the panoramic image to be stored in the image storage means. At this time, in general, since the pixel position does not assume an integer, the pixel value is determined, for example, according to the nearest-neighbor pixel method conducting the omission of fractions or the weighted mean method using four neighboring points.

Further, a description will be given hereinbelow of a superimposing method for the indication frame 204. The position of the indication frame 204 to be superimposed on the panoramic image display window 203 is calculated on the basis of the panning value, the tilting value and the zoom value of the panhead-mounted camera 110. That is, it is assumed that the panning value is taken to be θ (horizontal angle; degree is used as its unit), the tilting value is taken as φ (vertical angle; degree is used as its unit) and the zoom value is taken as Z (angle made by the image diagonal; degree is used as its unit) and the zoom value Z is not an extremely large value. Since an image according to the NTSC system assumes an aspect ratio of 4: 3, the horizontal view angle is "4Z/5" while the vertical view angle is "3Z/5".

Thus, the indication frame 204 is a rectangle to be formed by connecting the following points:
point (θ−(4Z/5), φ−(3Z/5)),
point (θ−(4Z/5), φ+(3Z/5)),
point (θ+(4Z/5), φ+(3Z/5)), and
point (θ+(4Z/5), φ−(3Z/5))

Incidentally, although in the above description the rectangular indication frame 204 is superimposed in the PC 109, it is also appropriate that the rectangular indication frame 204 is superimposed on the panoramic image prior to the image encoding.

As described above in detail, in the first embodiment, a detailed image picked up by the panhead-mounted camera 110 and a panoramic image, corresponding to the entire range sensible by the panhead-mounted camera 110, picked up by the wide-angle camera portion 101 are transmitted to the PC 109 to be displayed on different windows, respectively, so that the user of the PC 109 can see not only the detailed image he or she desires now but also an image surrounding the detailed image in substantially real time. Accordingly, by remotely controlling the parameters of the panhead-mounted camera 110 while seeing those windows, it is possible to change the display of the detailed image momentarily in accordance with the variation of the peripheral circumstances.

In addition, since the indication frame 204 equivalent to the visible field of the detailed image taken by the panhead-mounted camera 110 is superimposed and displayed on the panoramic image picked up by the wide-angle camera portion 101, it is possible to easily confirm the present image pickup direction and others of the panhead-mounted camera 110 and the peripheral image at that time, thus preventing operational errors.

FIG. 6 is a block diagram showing a second embodiment. In the first embodiment shown in FIG. 1, although only one wide-angle camera portion 101 is put to use, in the second embodiment a plurality of wide-angle camera portions are put to use so that images picked up by these camera portions are processed to be combined before transmitted. Incidentally, in FIG. 6, the same parts as those in FIG. 1 are denoted by the same reference numerals.

Figure 7:
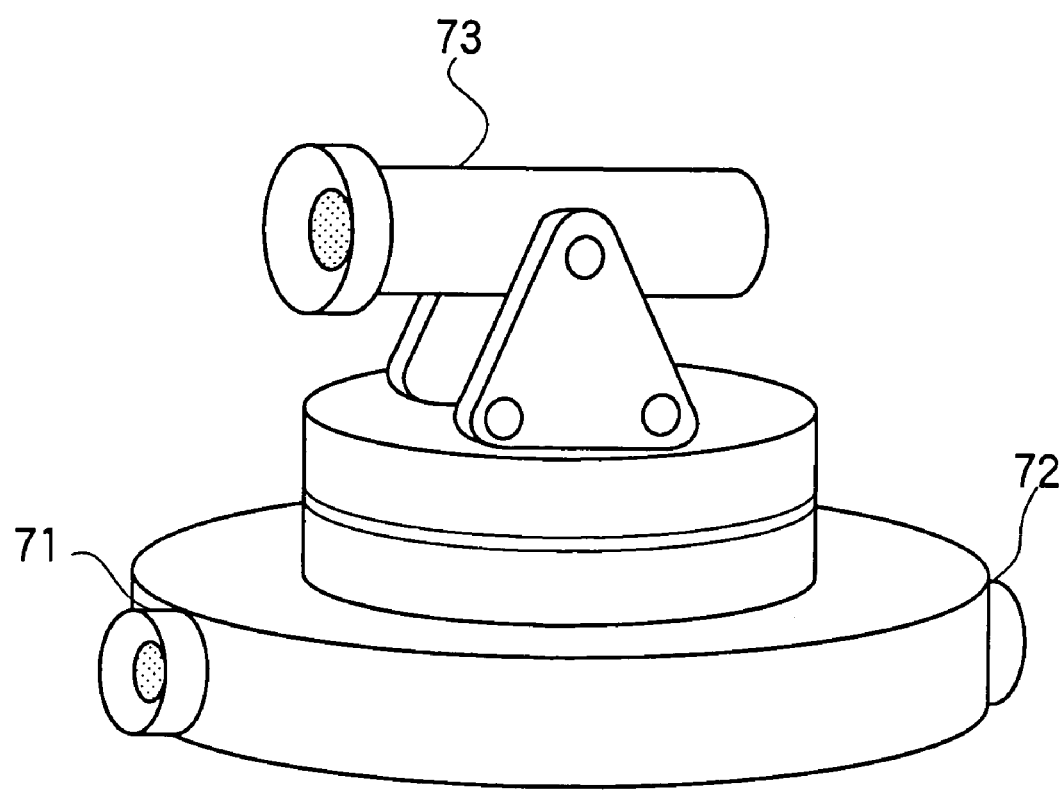
FIG. 7 is an illustration of an external configuration of a first apparatus for explaining a lens position in the second embodiment of the invention.

In the second embodiment, two wide-angle camera portions 101 and 601 are fixed in a state of making an angle of 180° therebetween, as shown in FIG. 7. In FIG. 7, reference numerals 71 and 72 designate wide-angle camera portions, respectively, and reference numeral 73 denotes a panhead-mounted camera. The panhead-mounted camera 73 may be constructed to de detachable from the main body.

Returning again to FIG. 6, a video signal 611 picked up by the wide-angle camera portion 601 is converted into a digital video signal 612 by an image digitizing circuit 602 and is then given to an image processing circuit 603. The image processing circuit 603 image-processes the digital video signal 112 from the image digitizing circuit 102 and the digital video signal 612 from the image digitizing circuit 602 into panoramic images having no distortion, and further combines the panoramic images with each other into one panoramic image and outputs the obtained panoramic image. Incidentally, contrary to the above, panoramic images may be combined before the panoramic images are image-processed so as to have no distortion.

As described above, as mentioned in the first embodiment, the second embodiment provides panoramic images, each covering the panning direction of 180°, by the two wide-angle camera portions 101 and 601 (71 and 72 in FIG. 7). In the second embodiment, these panoramic images are connected to each other to produce an image covering 360°, which is used for the control of the panhead-mounted camera 110. Thus, it is possible to change the display of the detailed image momentarily according to the peripheral situation variation or the like while seeing a wider range.

As described above, according to the first and second embodiments, an image picked up by a controllable camera and an image, covering the entire range sensible by the controllable camera, picked up by a wide-angle camera are transmitted from a first apparatus to a second apparatus, so that they are put to display. Accordingly, the user of the second apparatus can see not only a detailed image he or she desires now but also an image surrounding the detailed image in substantially real time. This permits the display of the detailed image to be changed on the moment according to the peripheral situation variation or the like in a manner that the user remotely controls the image pickup condition of the controllable camera while seeing these displays.

Accordingly, for instance, when, in a video conference or in remote surveillance, the image pickup condition of a remotely-controllable camera is interactively controlled while an image is seen, owing to the motion of the controllable camera, the image pickup condition is controllable while an image of the entire area sensible is seen, which ensures easy manipulations.

Figure 8:
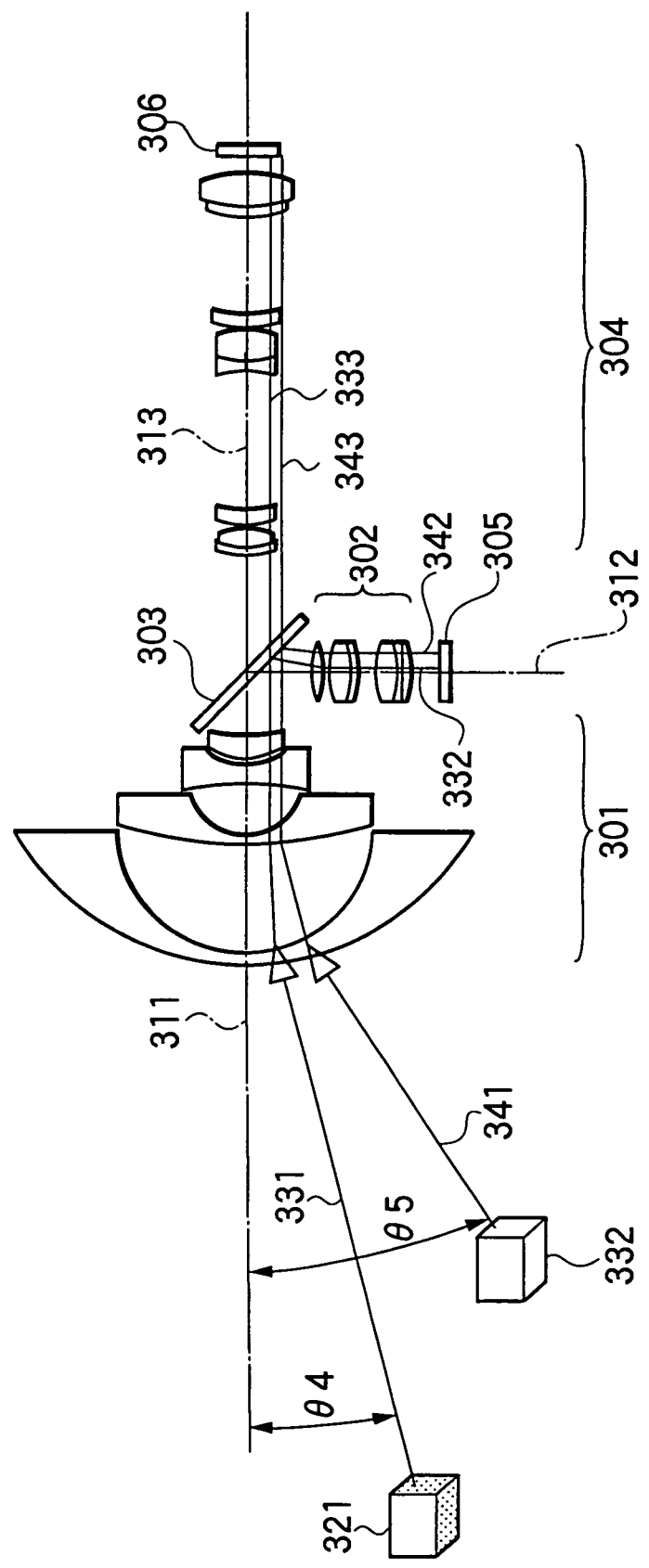
FIG. 8 is a schematic diagram showing a coaxial camera serving as an optical system of a first apparatus, which is a component of a camera control system according to a third embodiment of the invention.

FIG. 8 illustratively shows a coaxial camera serving as an optical system of a first apparatus, which is a component of a camera control system according to a third embodiment of the invention. In FIG. 8, reference numeral 301 represents a front stage portion which is a lens group serving as a part of each of a wide-angle (fisheye) lens and a telephoto lens, reference numeral 302 designates a first rear stage portion which is a lens group serving as a remaining part of the wide-angle lens, reference numeral 304 depicts a second rear stage portion which is a lens group serving as a remaining part of the telephoto lens, and reference numeral 303 denotes a half mirror disposed at a boundary position between the front stage portion 301 and each of the first rear stage portion 302 and the second rear stage portion 304. Thus, the wide-angle lens (fisheye lens), which has a distortion aberration and permits photography at a wide angle of view, is made up of the front stage portion 301 and the first rear stage portion 302, and constitutes a main element of a first camera portion (wide-angle camera). On the other hand, the telephoto lens, which is controllable in the image pickup condition (panning, tilting, zoom), is composed of the front stage portion 301 and the second rear stage portion 304, and constitutes a main element of a second camera portion (telephoto camera). The wide-angle camera and the telephoto camera constitute the coaxial camera of the a first apparatus. Reference numeral 311 signifies an optical axis of the front stage portion 301 common to the wide-angle lens and the telephoto lens, reference numeral 312 indicates an optical axis of the second rear stage portion 302 of the wide-angle lens, reference numeral 313 shows an optical axis of the second rear stage portion 304 of the telephoto lens, reference numeral 305 denotes a wide-angle-camera-side image sensor for receiving light from the wide-angle lens to convert the light into an electric signal, and reference numeral 306 means a telephoto-camera-side image sensor for receiving light from the telephoto lens to convert the light into an electric signal.

The wide-angle lens and the telephoto lens are arranged so that each of the optical axes of the respective rear stage portions 302 and 304 is branched by the half mirror 303. Therefore, the optical axes 311 and 312 of the wide-angle lens optically coincide with the optical axes 311 and 313 of the telephoto lens. Light 331 (341) from an object 321 (322) to be picked up is incident on the front stage portion 301 in a state of =making an angle θ4 (θ5) with respect to the optical axis 311 and is divided by the half mirror 303 into telephoto-lens-side light 333 (343) advancing straight and wide-angle-side light 332 (342) reflected approximately at right angles (90°). The light 332 (342) passes through the first rear stage portion 302 on the wide-angle lens side to form an image at a position separated by a certain distance from the center of the image sensor 305, while the light 333 (343) passes through the second rear stage portion 304 on the telephoto lens side to form an image at a position separated by a certain distance from the center of the image sensor 306.

Figure 9:
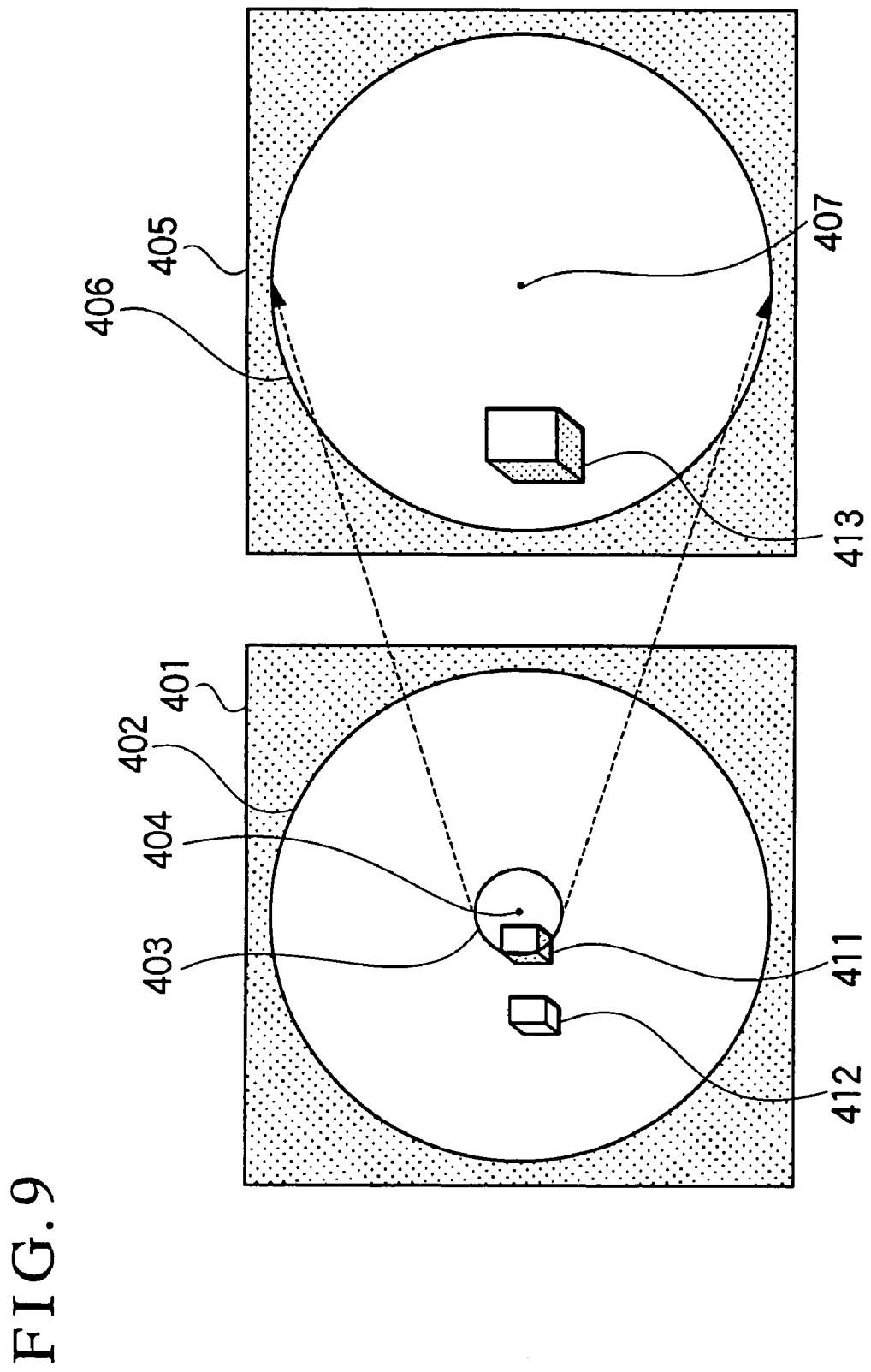
FIG. 9 is a schematic diagram showing video images obtainable through a wide-angle lens and a telephoto lens of the first apparatus in the third embodiment.

FIG. 9 illustratively shows images which are obtained through the wide-angle lens and the telephoto lens of the first apparatus. In FIG. 9, reference numeral 401 represents a total view angle of an image which is obtained by the wide-angle-lens-side image sensor 305, reference numeral 402 designates a figure showing a locus of image formation points of light incident at substantially right angles to the optical axis 311, reference numeral 403 depicts a figure showing a locus of image formation points of light incident at an angle of 10 degrees with respect to the optical axis 311, and reference numeral 404 indicates a point signifying the optical axis. Further, reference numeral 405 denotes a total view angle of an image which is obtained by the telephoto-lens-side image sensor 306, reference numeral 406 depicts a figure showing a locus of image formation points of light incident at an angle of 10 degrees with respect to the optical axis 311, and reference numeral 407 shows a point signifying the optical axis 313. Still further, reference numerals 411 and 412 represent images of the objects 321 and 322 by the wide-angle lens, respectively, and reference numeral 413 designates an image of the object 321 by the telephoto lens.

Figure 10:
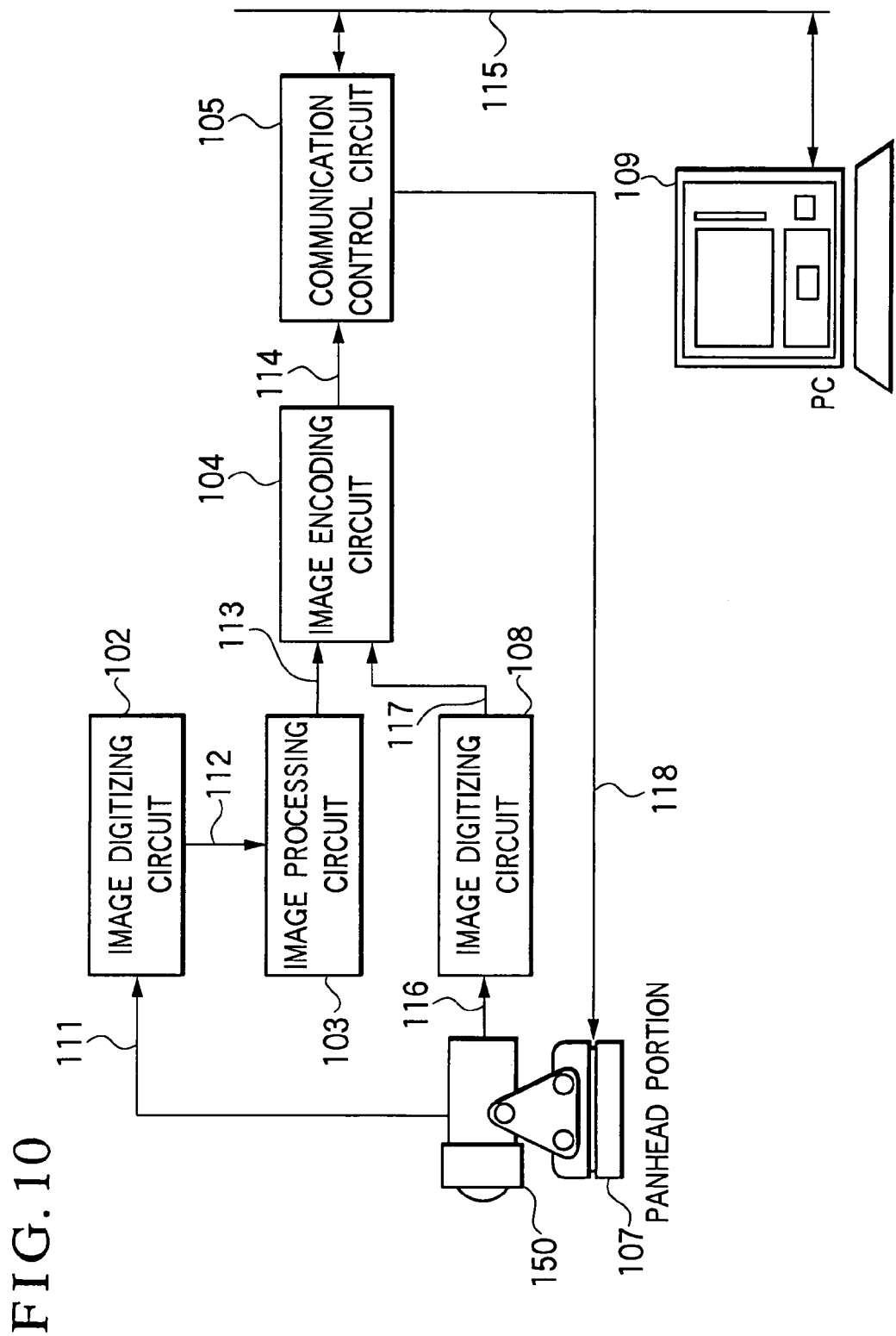
FIG. 10 is a block diagram showing in outline the arrangement of the camera control system according to the third embodiment.

FIG. 10 is a block diagram schematically showing the arrangement of a camera control system according to the third embodiment. In FIG. 10, reference numeral 150 represents the coaxial camera incorporating the wide-angle camera and the telephoto camera as shown in FIG. 8. The other arrangement is similar to the arrangement of the camera control system shown in FIG. 1, and the description thereof will be omitted for brevity.

Figure 11:
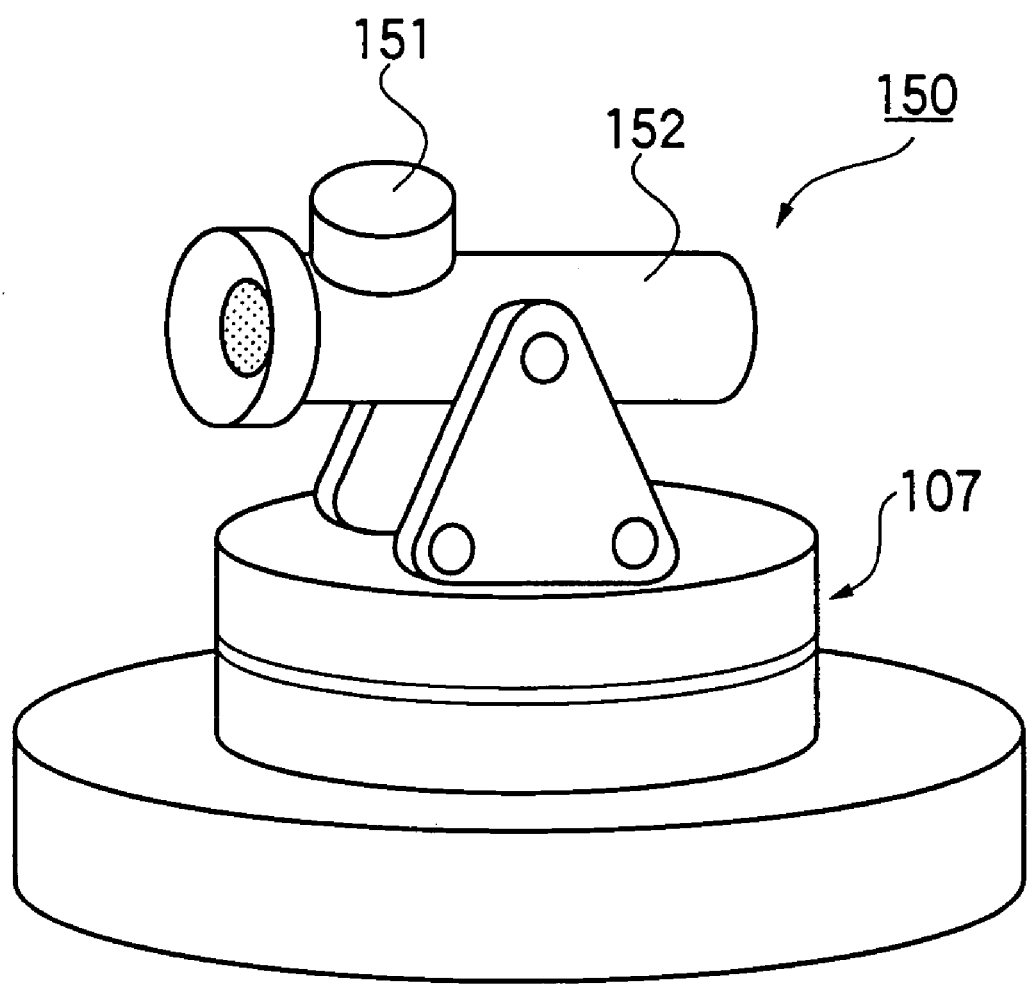
FIG. 11 is an illustration of the appearance of a coaxial camera of the camera control system according to the third embodiment.

FIG. 11 is an illustration of the appearance of the coaxial camera 150 of the camera control system according to the third embodiment. In FIG. 11, reference numeral 151 represents a rear end part of the wide-angle camera, while reference numeral 152 designates a rear end part of the telephoto camera.

Figure 12A:
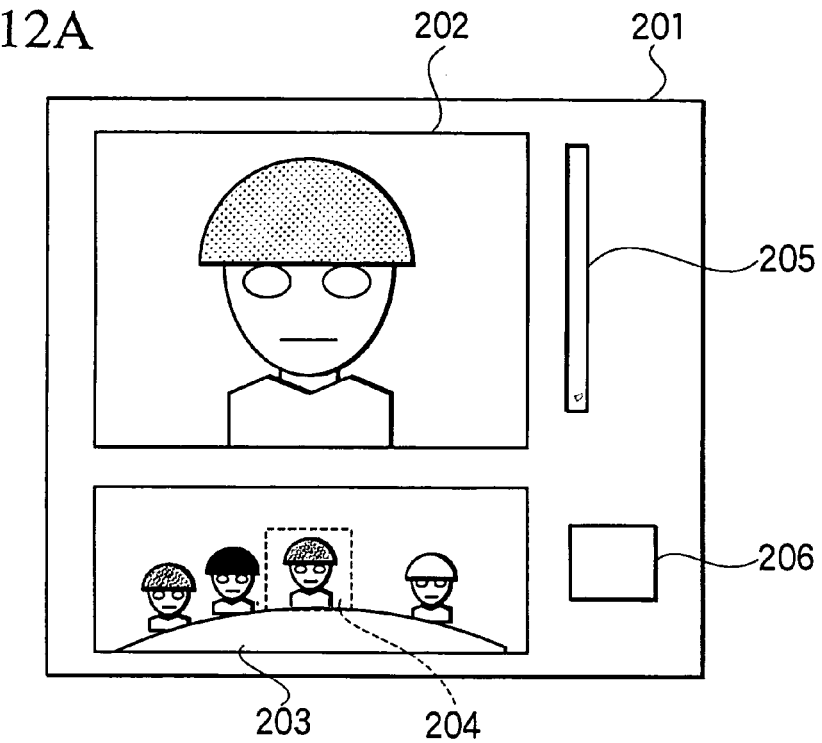
FIG. 12A illustratively shows an example of display of a video image on a personal computer in the third embodiment.
Figure 12B:
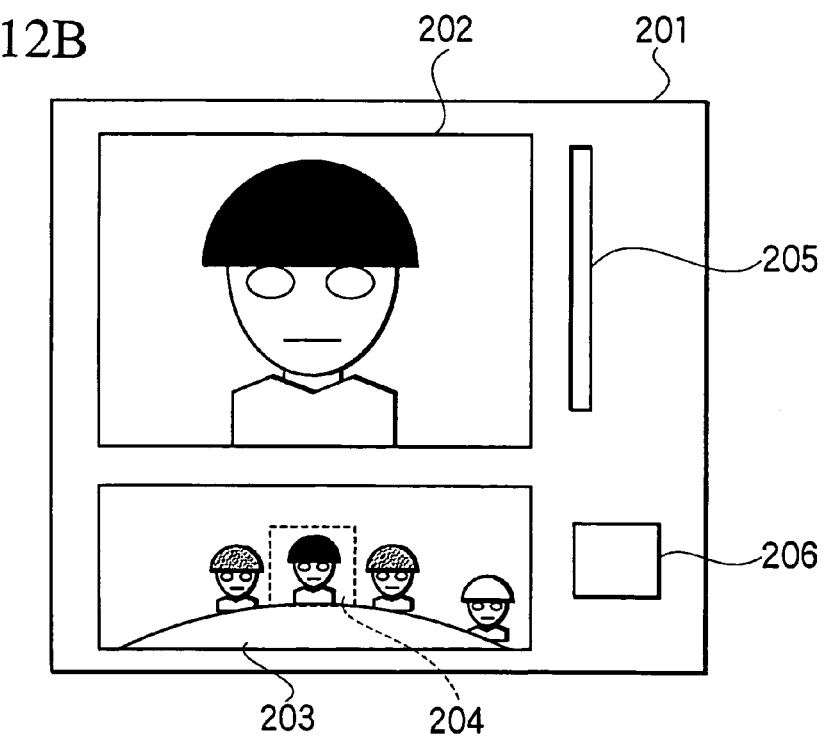
FIG. 12B illustratively shows another example of display of a video image on the personal computer in the third embodiment.

Since the wide-angle camera conducts the panning or tilting motion together with the telephoto camera, a rectangular indication frame 204 is always located at a central portion of a panoramic image display window 203 irrespective of the change of the object to be picked up by the telephoto camera, as shown in FIGS. 12A and 12B. As in the first embodiment, a wide-angle image undergoes the correction of its distortion by the image processing. Incidentally, in the third embodiment an image picked up by the telephoto camera also has a little distortion because of being picked up through the wide-angle lens. In order to correct such distortion, the image picked up by the telephoto camera also may be corrected by the image processing. In concrete terms, a video signal 111 by the wide-angle camera is converted into a digital video signal by an image digitizing circuit 102, and the digital video signal is corrected for distortion by an image processing circuit 103. Incidentally, it is also appropriate that, for example, the image processing circuit 103 conducts an affine transformation of the panoramic image 203 so that the panoramic image 203 shown in FIG. 12A always takes a constant position regardless of the movements of a panhead portion 107. In this case, the affine transformation is made on the basis of the information about the image pickup direction of the wide-angle camera.

Figure 13:
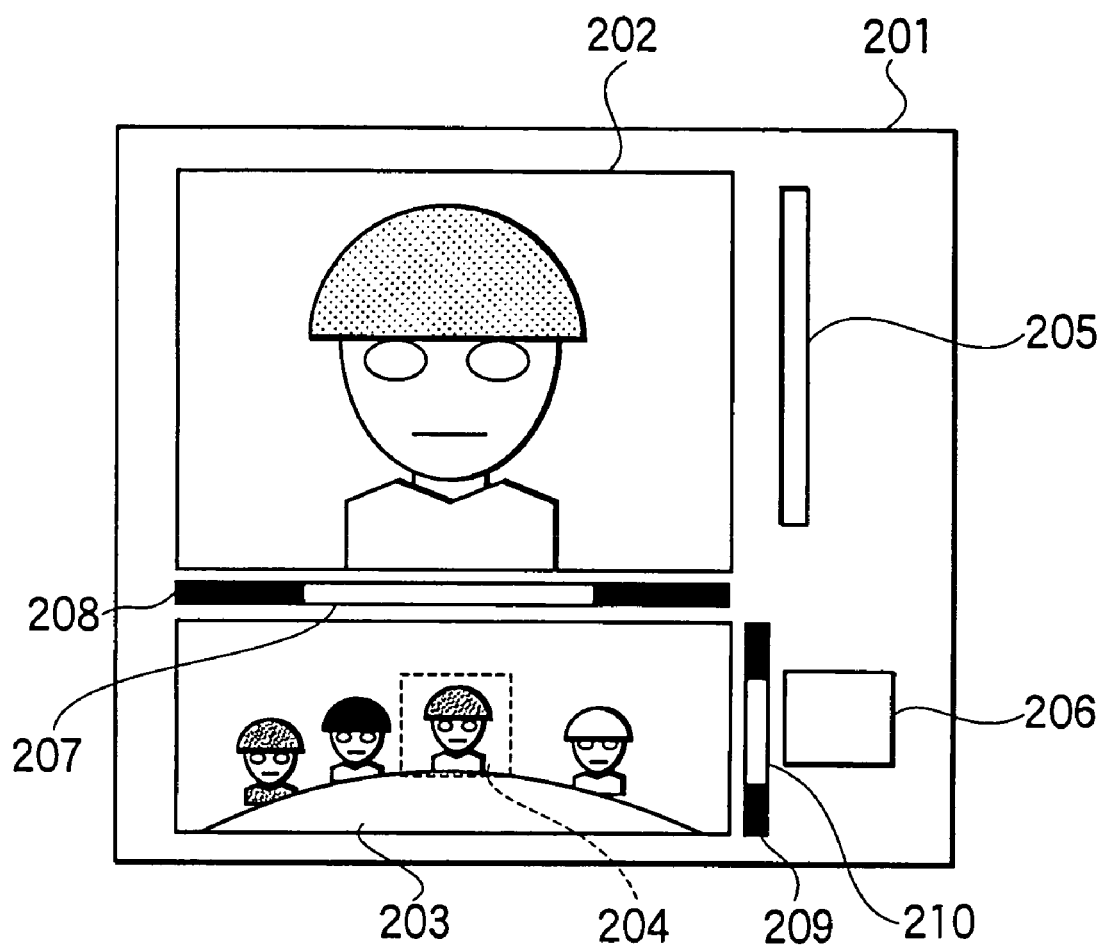
FIG. 13 illustratively shows an example of display of an indication of panning and tilting values in the third embodiment.

Although the range of angle of view of a detailed-image display window 202 to the operational range of panning and tilting is not displayed in the cases of FIGS. 12A and 12B, in a case where the panning value and the tilting value are to be displayed, the view angle range of the detailed-image display window 202 can be indicated through the use of scroll bars as shown in FIG. 13.

FIG. 13 illustratively shows an example of screen display for indicating panning and tilting values. In FIG. 13, reference numeral 208 denotes a scroll bar for display of a horizontal view angle, reference numeral 207 depicts a control knob for the panning operation, reference numeral 209 signifies a scroll bar for display of a vertical view angle range, and reference numeral 210 depicts a control knob for the tilting operation.

Figure 14:
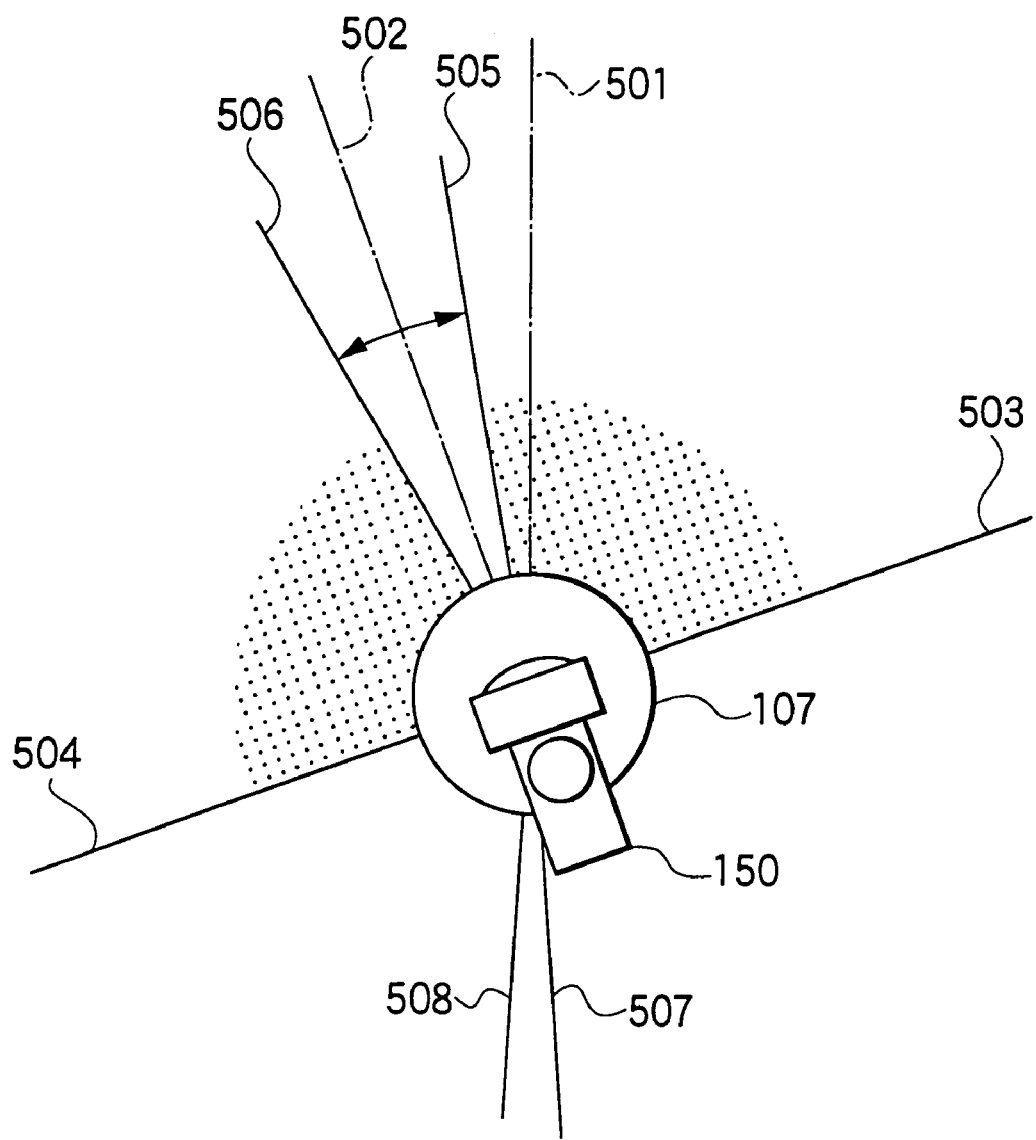
FIG. 14 illustratively shows the coaxial camera in the third embodiment, as viewed from above.

FIG. 14 illustratively shows the coaxial camera as viewed from above. In FIG. 14, an auxiliary line 501 signifies a front direction of the panhead portion 107, which is prescribed as 0 degree. An auxiliary line 502 indicates a front direction of the coaxial camera 150, an auxiliary line 503 depicts a right-hand end of a range sensible by the wide-angle camera, an auxiliary line 504 depicts a left-hand end of the range sensible by the wide-angle camera, an auxiliary line 505 represents a right-hand end of a range sensible by the telephoto camera, an auxiliary line 506 represents a left-hand end of the range sensible by the telephoto camera, an auxiliary line 507 designates a right-hand end of a range sensible by the wide-angle camera when the coaxial camera 150 is turned rightward up to a maximum by the panhead portion 107, and an auxiliary line 508 designates a left-hand end of a range sensible by the wide-angle camera when the coaxial camera 150 is turned leftward up to a maximum by the panhead portion 107.

The scroll bar 208 indicates a range from the auxiliary line 507 to the auxiliary line 508, with the central position of the range corresponding to the auxiliary line 501. Further, the control knob 207 for the panning operation indicates that a horizontal view angle range of the telephoto camera is from the auxiliary line 503 to the auxiliary line 504, with the central position of the range coinciding with the auxiliary line 502. That is, in the third embodiment, the control knobs 210 and 207 of the scroll bars 209 and 208 indicate an approximate place, which is currently being picked up, of the range sensible by the wide-angle camera. Further, it is also possible that a scroll bar for the panoramic image 203 is additionally superimposed in the control knobs 210 and 207 to indicate the field of view of the telephoto camera.

The production of a panoramic image in the third embodiment is identical to that of the first embodiment, and the description thereof will be omitted for simplicity.

Figure 15:
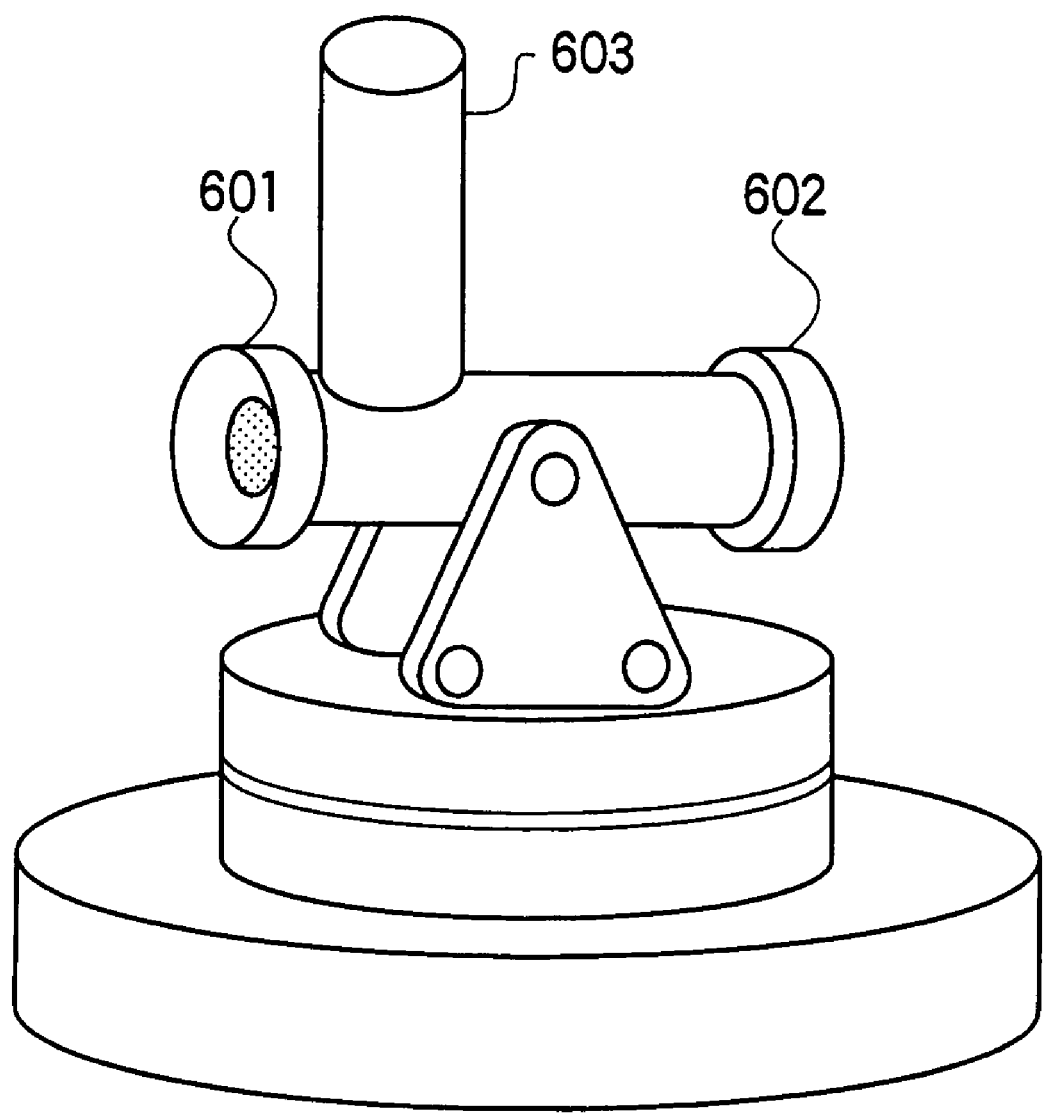
FIG. 15 illustratively shows a coaxial camera which is a component of a camera control system according to a modification of the third embodiment.

FIG. 15 illustratively shows a coaxial camera which is a component of a camera control system according to a modification of the third embodiment.

Although one wide-angle camera has been used in FIG. 11, in FIG. 15 two wide-angle cameras are used and the images obtained by the two wide-angle cameras are combined by image processing before being sent out. Concretely speaking, video signals 111 obtained by the two wide-angle cameras are converted into digital video signals by the image digitizing circuit 102, respectively, and then combined into one video image by the image processing circuit 103.

In FIG. 15, the two wide-angle cameras are fixed in a state of making an angle of 180° therebetween. In FIG. 15, reference numerals 601 and 602 designate the wide-angle cameras, respectively, and reference numeral 603 depicts a telephoto camera having a zooming function.

With the arrangement of FIG. 15, in addition to the effects of the third embodiment shown in FIG. 11, a panoramic image is obtainable with each of the wide-angle cameras 601 and 602 taking panning directions in a range of 180°, and the obtained panoramic images are connected to each other to produce a 360° image, which is used for the control of the telephoto camera 603. Accordingly, it is possible to change the display of the detailed image on the moment according to the peripheral situation variation or the like while seeing a wider range.

As described above in detail, according to the third embodiment, a detailed image picked up by a telephoto camera and a panoramic image, corresponding to the entire range sensible by the telephoto camera, picked up by the wide-angle cameras are transmitted to the PC 109 to be displayed on different windows, respectively. Accordingly, the user of the PC 109 can see the detailed image he or she desires now but also an image surrounding the detailed image in substantially real time. This means that, by remotely controlling the parameters of the telephoto camera while looking at these windows, it is possible to change the display of the detailed image on the moment according to the peripheral situation variation or the like.

In addition, since the indication frame 204 corresponding to the visible field of the detailed image taken by the telephoto camera is superimposed and displayed on the panoramic image taken by the wide-angle cameras, the easy confirmation of the present image pickup direction or the like of the telephoto camera and the peripheral image becomes possible, which contributes to the prevention of the operational errors in the posture control or the like.

Still additionally, since the wide-angle lens and the telephoto lens share the front stage portion and have the substantially identical optical axis, no azimuth difference occurs therebetween, so that it is possible to prevent the occurrence of operational errors to the utmost. If a first apparatus (camera apparatus) is composed of a first camera portion (wide-angle cameras) and a second camera portion (telephoto camera) which have the above-described lens configurations and is connected through a network to a second apparatus which can remotely controls the image-pickup states of the wide-angle cameras, the user on the second apparatus side can see the detailed image he or she desires now but also the peripheral image in substantially real time. Thus, by remotely controlling the parameters of the telephoto camera while looking at the windows, it is possible to change the display of the detailed image on the moment according to the peripheral situation variation or the like.

Accordingly, for instance, when, in a video conference or in remote surveillance, the image pickup condition of a remotely-controllable camera is interactively controlled while an image is seen, owing to the motion of the controllable camera, the image pickup condition is controllable while an image of the entire area sensible is seen, which ensures easy-handling manipulations.

Figure 16:
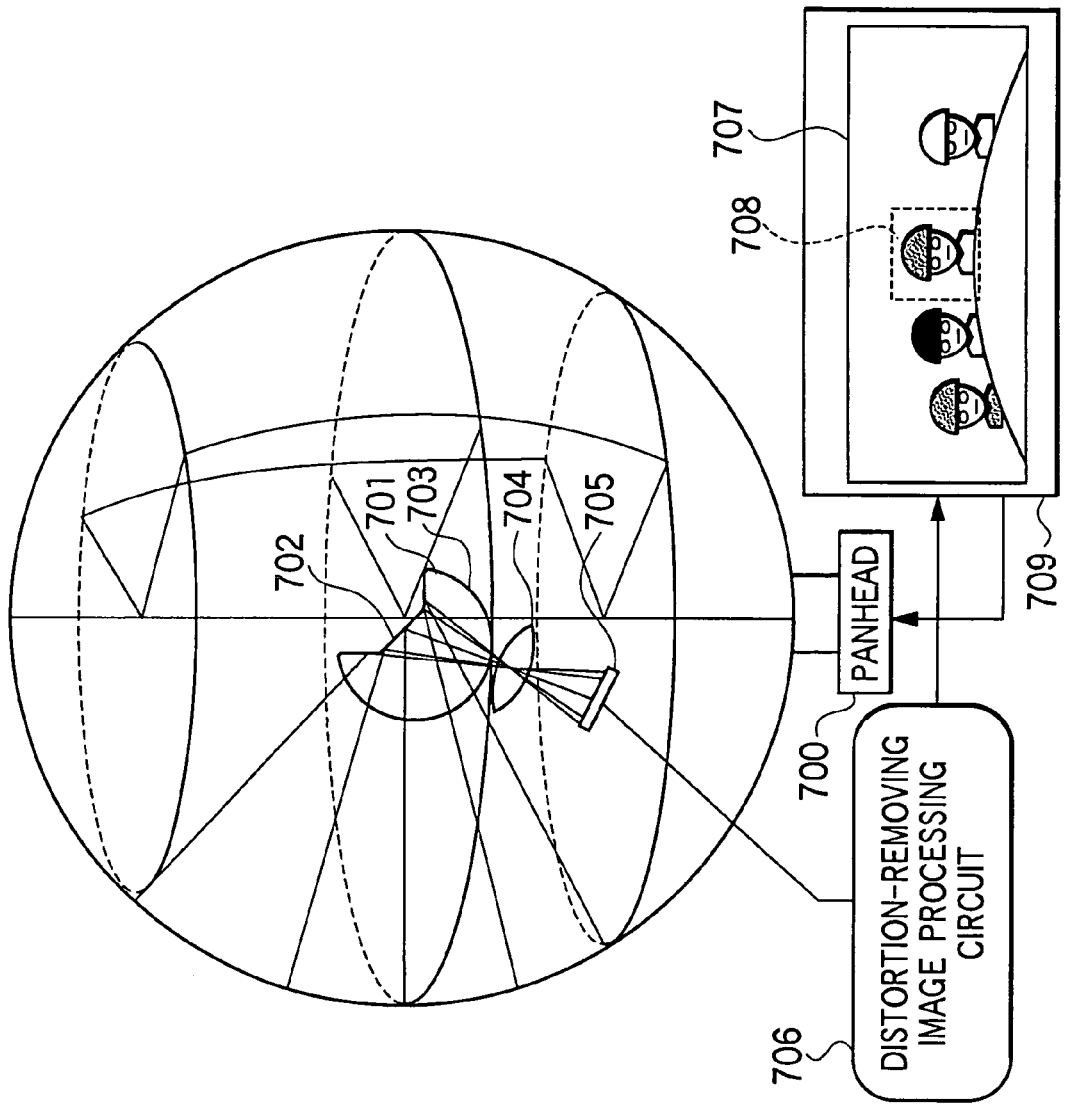
FIG. 16 illustratively shows a fovea centralis vision image pickup apparatus according to a fourth embodiment of the invention.

FIG. 16 illustratively shows a camera control system including a fovea centralis vision image pickup apparatus according to a fourth embodiment of the invention. In the first to third embodiments, two images (a panoramic image taken by a wide-angle camera portion and a detailed image taken by a zoom camera portion) are displayed on the side of the PC 109, whereas, in the fourth embodiment, a panoramic image and a detailed image are taken through the use of one image pickup element.

In FIG. 16, reference numeral 702 represents a convex mirror having a fovea centralis curved surface metal-deposited (which will be referred hereinafter to as a fovea centralis mirror), reference numeral 701 designates a block which is made from glass or transparent plastic and on which the fovea centralis mirror 702 is formed (which will be referred hereinafter to as a fovea centralis mirror block), reference numeral 703 depicts a light transmitting surface, reference numeral 704 denotes an optical member such as a convex lens for image formation, and reference numeral 705 indicates an image sensor portion for picking up a reflected moving image from the fovea centralis mirror 702 through the optical member 704. An optical system of the fovea centralis vision image pickup apparatus is made up of at least the fovea centralis mirror 702, the fovea centralis mirror block, the optical member 704 and the image sensor portion 705. Further, a panhead 700 is provided for panning and tilting the fovea centralis vision image pickup apparatus in accordance with a control instruction from a second apparatus, which will be described herein later, to shift the image pickup direction.

Furthermore, reference numeral 706 represents a distortion-removing image processing circuit composed of a CPU, a memory such as a RAM, a ROM for retaining programs, and others, reference numeral 707 signifies a panoramic image displayed in a second apparatus 709 connected through a network to the image processing circuit 706, with the second apparatus 709 being located at a remote place and constructed with a personal computer or the like. In connection to the second apparatus 709, the fovea centralis vision image pickup apparatus (first apparatus) is constructed using the above-mentioned components 700 to 706. Additionally, a frame 708 indicates a high-resolution portion corresponding to a central portion of the image in the second apparatus 709. When the frame 708 is shifted through the use of a mouse (not shown), a control command is outputted to the first apparatus so that an area within the frame 708 shifted comes to the center of the panoramic image 707. The panhead 700 is made to be controlled in accordance with that control command. The camera control system is composed of the first apparatus and the second apparatus.

Although not described in detail, the second apparatus 709 is connected to a network, and is constructed with a existing personal computer (PC), a network PC, a workstation or the like having a function of displaying hypertext data, or the like.

The fovea centralis mirror 702 has a fovea centralis configuration at its surface, with its central portion being a low-curvature surface and its peripheral portion being a high-curvature surface. In a concrete example, the surface of the fovea centralis mirror 702 is preferably a curved surface made by, when its center axis is taken as Y axis, rotating a curve expressed by $Y=aX^4$ (a: constant) around the Y axis.

The fovea centralis mirror 702 is located at such a position that the center axis of the fovea centralis mirror 702 is shifted from the center axis of light determined by the location of the image sensor portion 705.

A description will be made hereinbelow of an operation of the fovea centralis vision image pickup apparatus.

Figure 17:
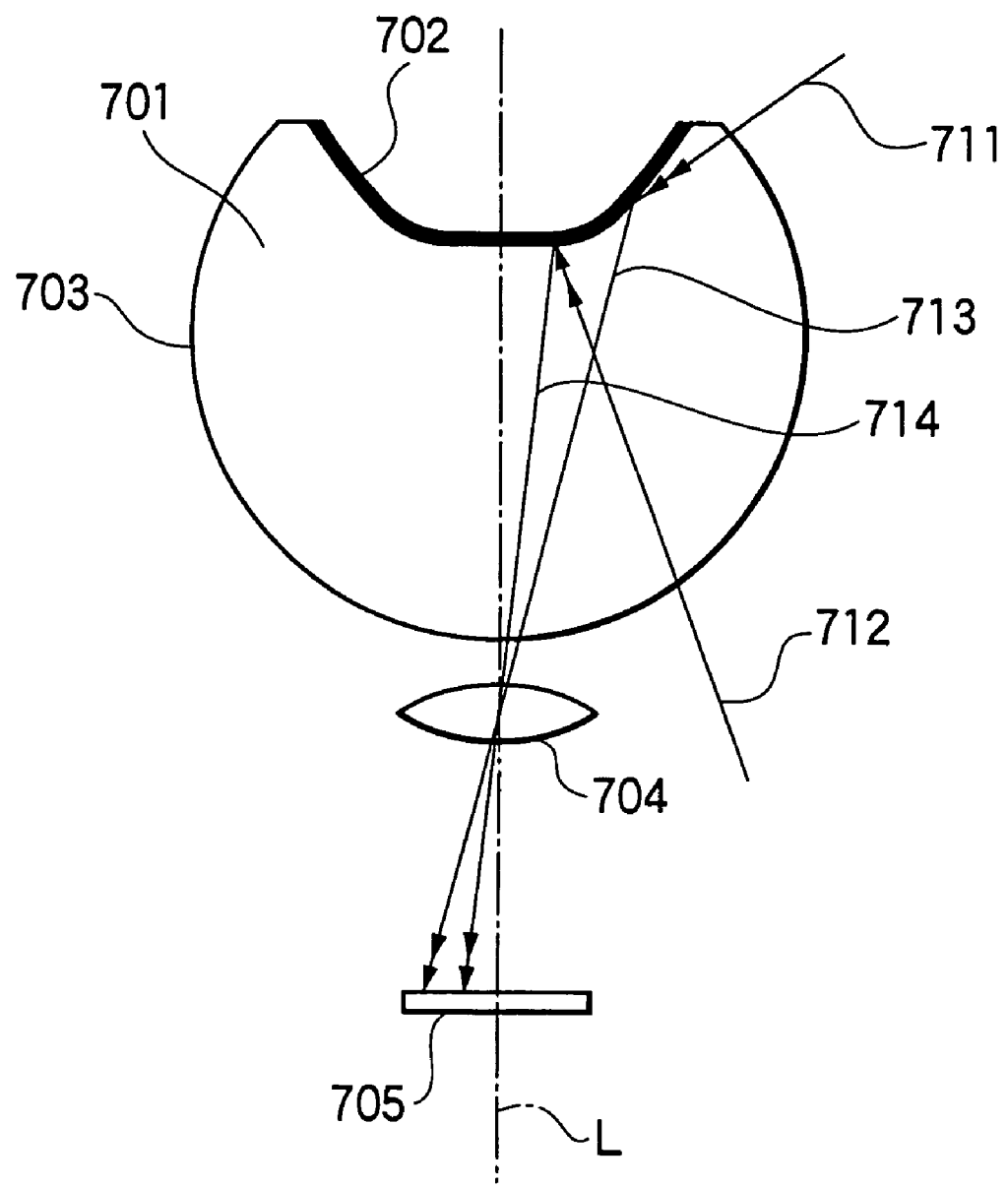
FIG. 17 is a horizontal cross-sectional view showing an optical system of the fovea centralis vision image pickup apparatus.

First of all, referring to FIG. 17, the description begins at an optical path along which light is incident on the fovea centralis mirror 702 and reflected thereon. FIG. 17 is a horizontal cross-sectional view showing an optical system of the fovea centralis vision image pickup apparatus, where the center axis of the fovea centralis mirror 702 is expediently drawn to be coincident with the center axis L of light determined by the location of the image sensor portion 705.

In FIG. 17, reference numeral 711 denotes incident light from a peripheral portion separated by 120° from the center axis L, reference numeral 712 depicts incident light from a central portion separated by 20° from the center axis L, reference numeral 713 indicates reflected light being the incident light 711 reflected on the fovea centralis mirror 702, and reference numeral 714 indicates reflected light being the incident light 712 reflected on the fovea centralis mirror 702.

The incident light 711 is reflected on the fovea centralis mirror 713 to become the reflected light 713. The reflected light 713 passes through the optical member 704 and then enters the image sensor portion 705. Further, the incident light 712 is reflected on the fovea centralis mirror 702 to become the reflected light 714. The reflected light 714 passes through the optical member 704 to come in the image sensor portion 705.

Figure 18:
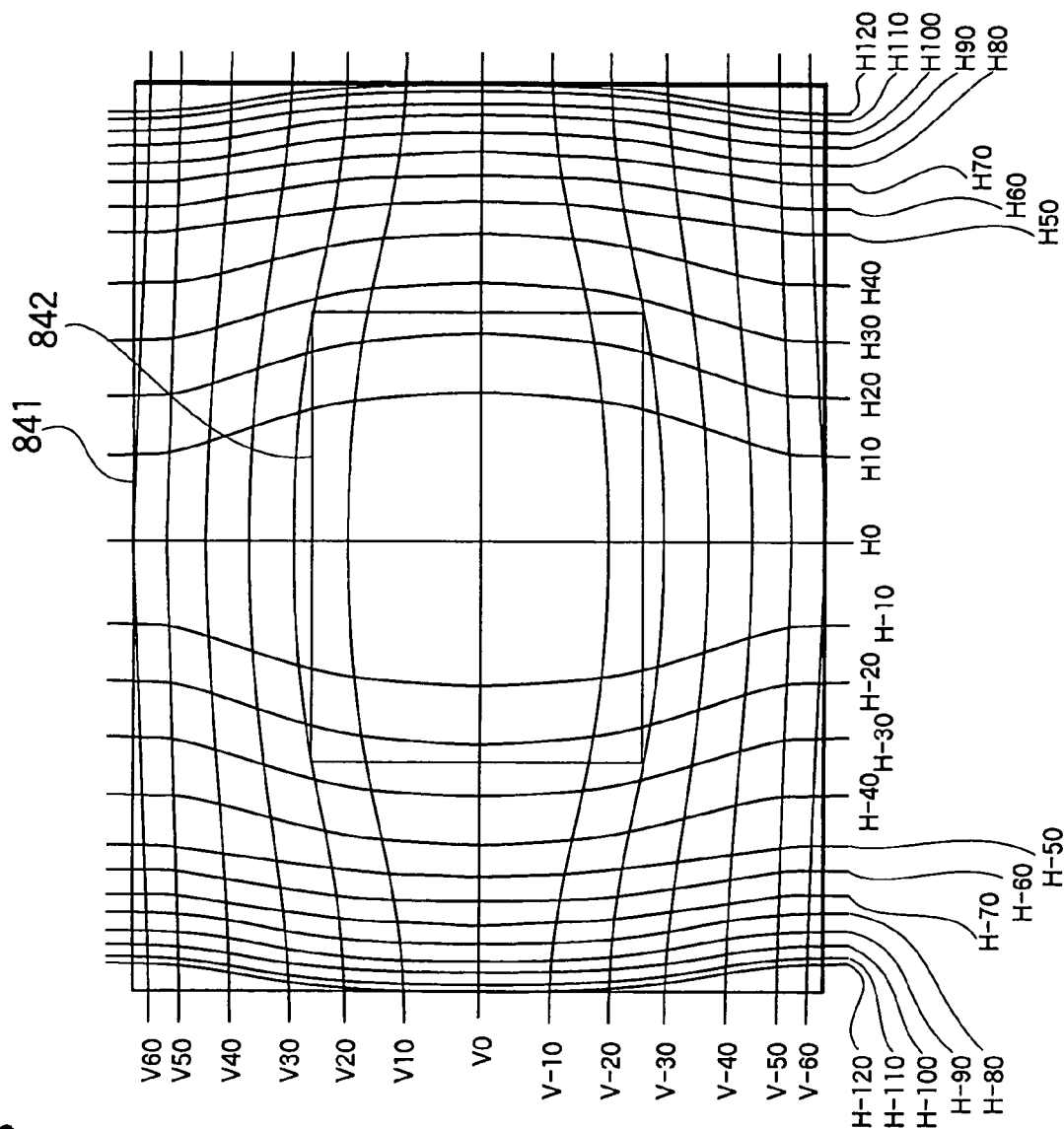
FIG. 18 is an illustration of characteristics of a fovea centralis mirror and an optical member.

FIG. 18 is an illustration of characteristics of the fovea centralis mirror 702 and the optical member 704, which constitute the optical system of the fovea centralis vision image pickup apparatus.

In FIG. 18, reference numeral 841 represents an effective area of the image sensor portion 705, and reference numeral 842 denotes a central portion of an image where its resolution is high. In this illustration, for instance, H0, H10 and H−10 signify loci, on the image sensor portion 705, of incident light beams in directions of horizontal angles 0°, 10° and −10° from the center axis, respectively, while, foe example, V0, V10 and V−10 signify loci, on the image sensor portion 705, of incident light beams in directions of vertical angles 0°, 10° and −10° from the center axis, respectively. Thus, the reflected light 713 passing through the optical member 704 is incident on the locus H120 in FIG. 18, while the reflected light 714 comes on the locus H20.

Figure 19A:
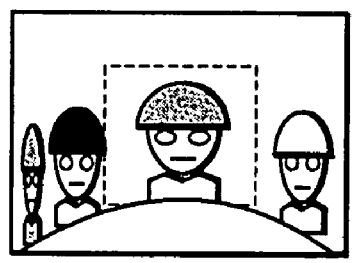
FIGS. 19(a) and 19(b) illustratively show an original image and a restored image obtained according to the invention, respectively.

FIG. 19(a) shows an example of a moving image (original image) taken by the image sensor portion 705 in the above way. In connection with the surface configuration of the fovea centralis mirror 702, an image with less distortion is formed at a central portion of the image sensor portion 705, while an image with much distortion is formed at a peripheral portion of the image sensor portion 705. As shown in FIG. 19(a), four persons sit down at a table, and a person located at the central portion is picked up in a state of a high resolution and no distortion, whereas the other three persons are picked up in a state of distortion. The distortion progressively increases toward the periphery.

Figure 19B:
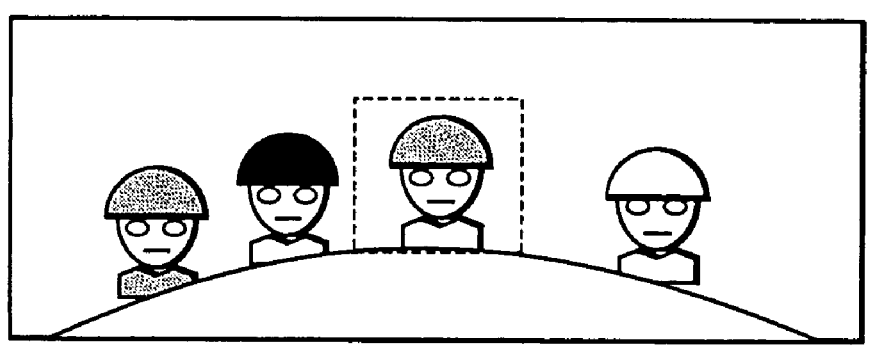

Further, in the image processing circuit 706, an image signal of the moving image shown in FIG. 19(a) is corrected through panoramic image producing processing which will be described hereinbelow, so that a moving image with no distortion is obtainable as a whole as shown in FIG. 19(b).

A detailed description will be made hereinbelow of the panoramic image producing processing.

To obtain a restored image (FIG. 19(b)) formed into a panoramic image, calculation is made to see the pixel in the original image (FIG. 19(a)) corresponding to a pixel in the a panoramic image, thereby conducting the corresponding pixel position transformation processing between the two images. In concrete terms, in a case where the transformation table is prescribed at an interval of 10° as shown in FIG. 18, for the measurement, the corresponding optical system is placed at the center of a spherical surface in which a mesh is drawn at an interval of 10°, and the spherical surface is picked up.

For instance, assuming that the intersection point of V20 and H–30 is a point signifying the 119th pixel in the upward direction from the center of the image sensor portion 705 and the 165th pixel in the leftward direction therefrom, this pixel address value is retained in the transformation table. In the case of every 10°, the "26×13=325" pixel address pairs are retained in the transformation table.

In this instance, supposing that the position of the two images is (w, v), the position is prescribed as follows:

$$(w, v) = T(x/10, y/10)$$

where x: horizontal angle; $-120 \leq x \leq 120$
y: vertical angle; $-60 \leq y \leq 60$.

In the fourth embodiment, for all the pixels of the image (FIG. 19(b)) restored as a panoramic image, the corresponding pixels in the original image (FIG. 19(a)) are calculated, and the pixel value of the restored image is calculated as follows:

$$(w1, v1) = T(x/10, y/10)$$

$$(w2, v2) = T((x/10)+1, y/10)$$

$$(w3, v3) = T((x/10)+1, (y/10)+1)$$

$$(w4, v4) = T(x/10, (y/10)+1)$$

as m=modulo (x, 10), n=modulo (y, 10), $$w = [\{w1*(10-m)+w2*m\}*(10-n)+\{w4*(10-m)+w3*m\}*n]/100$$

$$v = [\{v1*(10-n)+v4*n\}*(10-m)+\{v2*(10-n)+v3*n\}*m]/100.$$

The addresses of the corresponding pixels of the two images are obtained in the above way, and an extra-wide-angle panoramic moving image is obtainable with no distortion occurring throughout the whole image. Besides, no interpolation is made for the pixel values, but if the nearest-neighbor pixel values are taken, as the pixel value is D (x, y), it is calculated as follows:

$$D(x, y) = D(w, v)$$

Furthermore, if the transformation table is not prescribed at an interval of 10°, but is prescribed more finely, the values "10" and "100" in the above equations may be changed in accordance with the prescribed angular interval.

As described above, with the fovea centralis vision image pickup apparatus according to the fourth embodiment, since the fovea centralis mirror 702 is constructed such that its central portion has a low-curvature surface while its peripheral portion has a high-curvature surface, in accordance with the configuration of the fovea centralis mirror 702, it is possible to provide a moving image in which the resolution of its central portion is high while the resolution of its peripheral portion is low. Then, by the correction of the peripheral portion of the moving image, an extra-wide-angle panoramic image fitting human's visual sense is attainable. Accordingly, on the side of the second apparatus 709 (PC side), only one image is displayed, so that monitoring becomes simple.

That is, according to the fourth embodiment, by a method of sensing an image reflected on a convex mirror where its central portion shows a low curvature while its peripheral portion shows a high curvature, it is possible to provide an image pickup apparatus, having such a fovea centralis vision characteristic that the resolution of the central portion is high while the resolution of the peripheral portion is low, at a wider angle and at a lower cost as compared with a conventional one.

Incidentally, although in the first to fourth embodiments the correction of the distortion of a panoramic image is made in the image processing circuit 103 or 706 on the first apparatus side, it is also possible to conduct this processing on the side of the second apparatus (PC) 109 or 709.

Besides, the scope of the invention includes an approach in which, to operate various types of devices for fulfilling the functions of the above-described embodiments, a program code of a software for fulfilling the functions of the above-described embodiments is supplied to a computer in an apparatus or a system connected to the various types of devices and the various types of devices are operated according to a program installed in the computer (CPU or MPU) in the system or the apparatus.

In this case, the software program code itself can realize the functions in the above-described embodiments, and the program code itself and a means for supplying the program code to the computer, such as a recording medium storing the program code, constitute the invention. Among the recording mediums for storing the program code, there are a floppy disk, a hard disk, an optical disk, a magneto-optical disk, a CD-ROM, a magnetic tape, a non-volatile memory card a ROM and others.

Naturally, the program code is involved in an embodiment of the invention, not only in the case that the functions of the above-described embodiments are realized in a manner that the computer implements the supplied program code, but also in the case that the functions of the above-described embodiments are realized with the program code being used in cooperation with the OS (operating system) being in operation in the computer, other application software or the like.

Moreover, naturally, the invention also includes the case of realizing the functions of the above-described embodiments in a manner that the supplied program code is stored in an extension board of the computer or an extension unit connected to the computer and a CPU or the like provided in the extension board or the extension unit implements a portion of or all of the actual processing.

What is claimed is:

1. A camera control system comprising:
    first image pickup device which picks up an image of an object through a wide-angle lens having distortion, to output frame images which are generated within a predetermined fixed area consecutively in a first interval;
    image processing device which performs projective transformation processing to correct distortion of the frame images outputted from said first image pickup device;

second image pickup device having no distortion, which outputs frame images which are generated consecutively in a second interval which is shorter than the first interval;

display device which displays the frame images processed by said image processing device, and which superimposes and displays, on the displayed frame images, a rectangular frame indicative of an image-pickup area of said second image pickup device, and displays the frame images from said second image pickup device together with the processed frame images and the rectangular frame;

designating device which designates a desired rectangular area within the frame images displayed by said display device;

control device which controls at least one of panning, tilting and zooming of said second image pickup device in such a way as to pick up an image corresponding to the rectangular area designated by said designating device, and;

wherein, a frame image of the first image pickup device to be displayed by said display device is generated independently of the first interval, in response that said control device completes the control of said second image pickup device in accordance with the designation by said designating device.

2. A camera control system according to claim 1, wherein said display device displays, on a common screen, the frame images by said image processing device and the frame images outputted from said second image pickup device.

3. A camera control system according to claim 1, wherein a position and a size of the rectangular frame displayed by said display device are determined on the basis of a parameter outputted from said second image pickup device.

4. A camera control system according to claim 1, wherein said first image pickup device includes a plurality of image pickup devices, and said image processing device processes and combines groups of frame images outputted from said plurality of image pickup devices into one group of frame images.

5. A camera control system according to claim 1, further comprising:
an optical member for making object light incident thereon; and
an optical splitting member for splitting the object light coming through said optical member into two light beams and for making the two split light beams incident on said first image pickup device and said second image pickup device, respectively, so that image-pickup optical axes of said first image pickup device and said second image pickup device coincide with each other.

6. A camera control system according to claim 1, wherein said image processing device executes an affine transformation on the basis of information on an image-pickup direction of said first image pickup device.

7. A camera control system according to claim 1, wherein said wide-angle lens having distortion for use with said first image pickup device is a fisheye lens.

8. A camera control method comprising the steps of:
generating frame images within a predetermined fixed area by using a first image pickup device through a wide-angle lens having distortion consecutively in a first interval;
performing projective transformation processing to correct distortion of the frame images generated by using said first image pickup device;
generating frame images by using a second image pickup device having no distortion consecutively in a second interval which is shorter than the first interval;
displaying the processed frame images, and superimposing and displaying, on the displayed frame images, a rectangular frame indicative of an image-pickup area of said second image pickup device, and displaying the frame images from said second image pickup means device together with the processed frame images and the rectangular frame;
designating a desired rectangular area within the moving image the frame images;
controlling at least one of panning, tilting and zooming of said second image pickup device in such a way as to pick up an image corresponding to the designated rectangular area; and
wherein, said generating step generates a frame image of the first image pickup device to be displayed independently of the first interval, in response that said controlling step completes the control in accordance with the designation.

9. A camera control method according to claim 8, wherein the processed frame images and the frame images outputted from said second image pickup device are displayed on a common screen.

10. A camera control method according to claim 8, wherein a position and a size of the displayed rectangular frame are determined on the basis of a parameter outputted from said second image pickup device.

11. A camera control method according to claim 8, wherein said first image pickup device includes a plurality of image pickup devices, and groups of frame images outputted from said plurality of image pickup devices are processed and combined into one group, of frame images.

12. A camera control method according to claim 8, further comprising the steps of:
making object light incident on an optical member; and
splitting the object light coming through said optical member into two light beams and making the two split light beams incident on said first image pickup device and said second image pickup device, respectively, so that image-pickup optical axes of said first image pickup device and said second image pickup device coincide with each other.

13. A camera control method according to claim 8, wherein said projective transformation processing includes an affine transformation which is executed on the basis of information on an image-pickup direction of said first image pickup device.

14. A camera control method according to claim 8, wherein said wide-angle lens having distortion for use with said first image pickup means device is a fisheye lens.

15. A storage medium which stores therein a program for executing a process of controlling a camera control system, said process comprising:
generating frame images within a predetermined fixed area by using a first image pickup device through a wide-angle lens having distortion consecutively in a first interval;
performing projective transformation processing to correct distortion of the frame image generated by using said first image pickup device;
generating frame images by using a second image pickup device having no distortion consecutively in a second interval which is shorter than the first interval;
displaying the processed framed images, and superimposing and displaying, on the displayed framed images, a rectangular frame indicative of an image-pickup area of said second image pickup device, and displaying the framed images from said second image pickup device together with the processed moving image and the rectangular frame;

designating a desired rectangular area within the frame images;

controlling at least one of panning, tilting and zooming of said second image pickup device in such a way as to pick up an image corresponding to the designated rectangular area; and wherein, said generating process generates a frame image of the first image pickup device to be displayed independently of the first interval, in response that said controlling process completes the control in accordance with the designation.

16. A camera control system comprising:

a first image pickup device which generates first frame images within a predetermined fixed area consecutively in a first interval and outputs the first frame images;

a second image pickup device which generates second frame images consecutively in a second interval which is shorter than the first interval and outputs the second frame images;

a display device which displays the first frame images outputted by said first image pickup device, and which superimposes and displays, on the first frame images, a rectangular frame indicative of an image-pickup area of said second image pickup device, and displays the second frame images from said second image pickup device together with the first frame images and the rectangular frame;

a designating device which designates a desired rectangular area within the first frame images displayed by said display device;

a control device which controls at least one of panning, tilting and zooming of said second image pickup device in such a way as to pick up an image corresponding to the rectangular area designated by said designating device and;

wherein, the first image pickup device generates a frame image to be displayed by said display device independently of the first interval, in response that said control device completes the control of said second image pickup device in accordance with the designation by said designating device.

17. A camera control system according to claim 16, wherein said display device displays, on a common screen, the first frame images and the second frame images.

18. A camera control system according to claim 16, wherein a position and a size of the displayed rectangular frame are determined on the basis of a parameter outputted from said second image pickup device.

19. A camera control system according to claim 16, wherein said first image pickup device includes a plurality of image pickup devices, and said image processing device processes and combines groups of frame images outputted from said plurality of image pickup devices into one group of frame images.

20. A camera control method comprising the steps of:

generating first frame images within a predetermined fixed area by using a first image pickup device consecutively in a first interval;

generating second frame images by using a second image pickup device consecutively in a second interval which is shorter than the first interval;

displaying the first frame images, and superimposing and displaying, on the first frame images, a rectangular frame indicative of an image-pickup area of said second image pickup device, and displaying the second frame images from said second image pickup device together with the first frame images and the rectangular frame;

designating a desired rectangular area within the first frame images;

controlling at least one of panning, tilting and zooming of said second image pickup device in such a way as to pick up an image corresponding to the rectangular area and;

wherein, said generating step generates a frame image to be displayed independently of the first interval, in response that said controlling step completes the control of said second image pickup device in accordance with the designation.

21. A camera control method according to claim 20, wherein the first frame images and the second frame images are displayed on a common screen.

22. A camera control method according to claim 20, wherein a position and a size of the displayed rectangular frame are determined on the basis of a parameter outputted from said second image pickup device.

23. A camera control method according to claim 20, wherein said first image pickup device includes a plurality of image pickup devices, and groups of frame images outputted from said plurality of image pickup devices are processed and combined into one group of frame images.

* * * * *

UNITED STATES PATENT AND TRADEMARK OFFICE
CERTIFICATE OF CORRECTION

PATENT NO.       : 6,977,676 B1
APPLICATION NO.  : 09/346256
DATED            : December 20, 2005
INVENTOR(S)      : Mamoru Sato et al.

It is certified that error appears in the above-identified patent and that said Letters Patent is hereby corrected as shown below:

Column 12, line 16, delete "of =making" and insert --of making--

Column 20, lines 11-12 delete "moving image the"

Column 20, line 34, delete "one group," and insert --one group--

Signed and Sealed this

Twentieth Day of May, 2008

JON W. DUDAS
*Director of the United States Patent and Trademark Office*